United States Patent
Hanyu et al.

(10) Patent No.: US 8,891,815 B2
(45) Date of Patent: Nov. 18, 2014

(54) INVISIBLE INFORMATION EMBEDDING APPARATUS, INVISIBLE INFORMATION DETECTING APPARATUS, INVISIBLE INFORMATION EMBEDDING METHOD, INVISIBLE INFORMATION DETECTING METHOD, AND STORAGE MEDIUM

(75) Inventors: Naoto Hanyu, Kanagawa (JP); Hiroshi Fukui, Kanagawa (JP); Kenichi Sakuma, Kanagawa (JP); Takakuni Douseki, Shiga (JP); Kazuma Kitamura, Shiga (JP)

(73) Assignees: Shiseido Company, Ltd., Tokyo (JP); The Ritsumeikan Trust, Kyoto (JP)

( * ) Notice: Subject to any disclaimer, the term of this patent is extended or adjusted under 35 U.S.C. 154(b) by 94 days.

(21) Appl. No.: 13/514,108

(22) PCT Filed: Dec. 8, 2010

(86) PCT No.: PCT/JP2010/072039
§ 371 (c)(1),
(2), (4) Date: Jun. 6, 2012

(87) PCT Pub. No.: WO2011/071081
PCT Pub. Date: Jun. 16, 2011

(65) Prior Publication Data
US 2012/0237079 A1 Sep. 20, 2012

(30) Foreign Application Priority Data

Dec. 8, 2009 (JP) .................................. 2009-278883
Aug. 27, 2010 (JP) .................................. 2010-191267

(51) Int. Cl.
*G06K 9/00* (2006.01)
*H04N 1/32* (2006.01)
*G06T 1/00* (2006.01)

(52) U.S. Cl.
CPC ....... *H04N 1/32203* (2013.01); *H04N 1/32229* (2013.01); *G06T 2201/0051* (2013.01); *G06T 1/005* (2013.01); *G06T 2201/0065* (2013.01)
USPC ......................................................... 382/100

(58) Field of Classification Search
None
See application file for complete search history.

(56) References Cited

U.S. PATENT DOCUMENTS 6,411,725 B1 * 6/2002 Rhoads .......................... 382/100
7,796,776 B2 * 9/2010 Inatomi et al. ................ 382/100

(Continued)

FOREIGN PATENT DOCUMENTS

CN 1618077 A 5/2005
CN 1795454 A 6/2006

(Continued)

OTHER PUBLICATIONS

Chinese Office Action mailed Jul. 24, 2013.

(Continued)

*Primary Examiner* — Avinash J Yentrapati
(74) *Attorney, Agent, or Firm* — IPUSA, PLLC

(57) ABSTRACT

An invisible information embedding apparatus for embedding invisible information at a position in an obtained image includes an image analysis unit configured to obtain object information and positional information of an object included in the image, an embedding target image determining unit configured to determine whether the image is an embedding target based on the object information obtained by the image analysis unit, and an image synthesizing unit configured to combine the image with the invisible information based on the determination result of the embedding target image determining unit.

3 Claims, 29 Drawing Sheets

(56) References Cited

U.S. PATENT DOCUMENTS

| | | | |
|---|---|---|---|
| 7,822,225 B2* | 10/2010 | Alattar | 382/100 |
| 7,880,929 B2* | 2/2011 | Kaneko et al. | 358/1.9 |
| 7,925,042 B2* | 4/2011 | Kimura et al. | 382/100 |
| 8,090,141 B2* | 1/2012 | Eschbach et al. | 382/100 |
| 8,189,853 B2* | 5/2012 | Komatsubara et al. | 382/100 |
| 8,379,908 B2* | 2/2013 | Davis et al. | 382/100 |
| 2002/0071593 A1* | 6/2002 | Muratani | 382/100 |
| 2005/0072846 A1 | 4/2005 | Lubow | |
| 2005/0100671 A1 | 5/2005 | Kawada et al. | |
| 2006/0071080 A1 | 4/2006 | Moroto | |
| 2007/0108287 A1* | 5/2007 | Davis et al. | 235/462.01 |
| 2008/0170269 A1* | 7/2008 | Kaneko et al. | 358/3.28 |
| 2009/0050700 A1 | 2/2009 | Kamijoh et al. | |
| 2009/0124195 A1 | 5/2009 | Kamijoh et al. | |
| 2010/0034513 A1* | 2/2010 | Nakano et al. | 386/94 |
| 2010/0045701 A1* | 2/2010 | Scott et al. | 345/633 |
| 2011/0194730 A1* | 8/2011 | Rhoads et al. | 382/100 |

FOREIGN PATENT DOCUMENTS

| | | |
|---|---|---|
| CN | 101072340 A | 11/2007 |
| CN | 101504760 A | 8/2009 |
| EP | 2043041 | 4/2009 |
| JP | 11-041453 | 2/1999 |
| JP | 2000-082107 | 3/2000 |
| JP | 2002-032076 | 1/2002 |
| JP | 2002-118736 | 4/2002 |
| JP | 2004-178446 | 6/2004 |
| JP | 2005-142836 | 6/2005 |
| JP | 2007-088801 | 4/2007 |
| JP | 2008-301050 | 12/2008 |
| WO | WO2005/074248 | 8/2005 |
| WO | WO2007/015452 | 2/2007 |
| WO | WO2009000204 A1 | 12/2008 |

OTHER PUBLICATIONS

Japanese Office Action dated Jul. 19, 2011.
http://www.hitl.washington.edu/artoolkit/, "ARToolKit News Download Projects Publications Community Documentation".
Office Action in Japanese Patent Application No. 2010-191267 mailed Mar. 13, 2012.
International Search Report mailed on Mar. 15, 2011.
The extended European search report mailed Feb. 1, 2013.

* cited by examiner

FIG.9
(a)
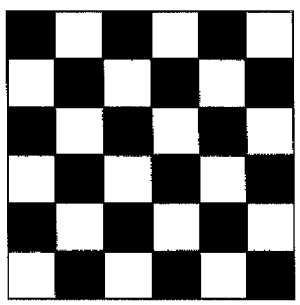
(b)
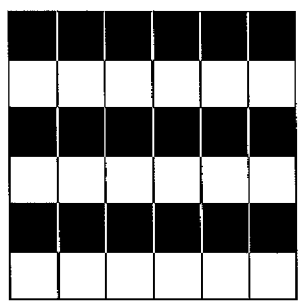
(c)
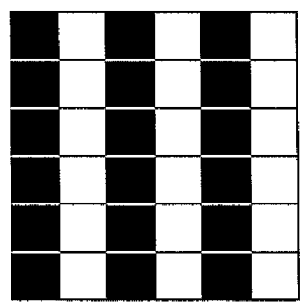
(d)
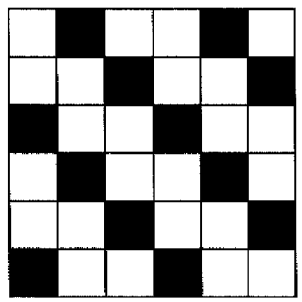
(e)
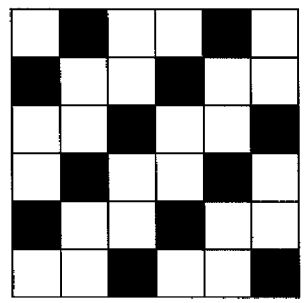

FIG.13B

| BRIGHTNESS | INCREMENT/ DECREMENT VALUE |
|---|---|
| 190~255 | 45 |
| 125~189 | 35 |
| 90~124 | 30 |
| 60~89 | 25 |
| 30~59 | 20 |
| 0~30 | 10 |

|  | READ TIME | NUMBER OF INSTRUCTIONS EXECUTED | CPU UTILIZATION | MEMORY USAGE |
|---|---|---|---|---|
| FREQUENCY METHOD | LESS THAN 1 s | 15,242 M | 69.1% | 27.59 M |
| DIFFERENCE METHOD | 13 s | 282,452 M | 98.5% | 38.24 M |

INVISIBLE INFORMATION EMBEDDING APPARATUS, INVISIBLE INFORMATION DETECTING APPARATUS, INVISIBLE INFORMATION EMBEDDING METHOD, INVISIBLE INFORMATION DETECTING METHOD, AND STORAGE MEDIUM

TECHNICAL FIELD

The present invention generally relates to a document processing apparatus and a document processing method. More particularly, the present invention relates to a document processing apparatus and a document processing method for displaying a document having layout information in a display mode suitable for a screen, for example, on a mobile terminal.

The present invention relates to an invisible information embedding apparatus, an invisible information detecting apparatus, an invisible information embedding method, an invisible information detecting method, and a storage medium that make it possible to efficiently obtain information and thereby make it possible to provide a high-precision, high-value-added image.

BACKGROUND ART

There is a known technology where an image of a card on which a pattern is drawn is taken with a camera, and an image or a Musical Instrument Digital Interface (MIDI) signal for controlling a musical instrument is output based on the type of the card and/or three-dimensional positional information obtained from the taken image (see, for example, patent document 1).

There also exists a system tool that recognizes a figure on paper with a camera and displays a virtual image on a display of a personal computer (see, for example, non-patent document 1).

Also, there is a known image processing technology that makes it possible to obtain a target image including identification information corresponding to a predetermined image pattern, recognize the identification information from the obtained target image, perform one of pre-registered processes that corresponds to the recognized identification information, display the target image in a predetermined display area, obtain positional information on two or more predetermined positions in he displayed target image, and draw an image corresponding the recognized identification information in an orientation and a position based on the obtained positional information (see, for example, patent document 2).

Further, there is a known digital watermark technology that makes it possible to embed, in a digital content such as a still image, a video, or an audio, information that is different from the digital content and not perceivable by a human being (see, for example, patent documents 3 and 4).

RELATED-ART DOCUMENTS

Patent Documents

[Patent document 1] Japanese Laid-Open Patent Publication No. 2002-32076
[Patent document 2] Japanese Laid-Open Patent Publication No. 2000-82107
[Patent document 3] WO 2005/074248
[Patent document 4] WO 2007/015452

Non-Patent Documents

[Non-patent document 1]"http://www.hitl.washington.edu/artoolkit/", ARToolKit

DISCLOSURE OF INVENTION

Problems to be Solved by the Invention

With the related-art technology of patent document 1 described above, it is possible to synthesize and display a moving image by moving, for example, a card in a predetermined direction (e.g., in a horizontal direction or a rotational direction). However, with the related-art technologies, it is not possible to synthesize and display a moving image without moving, for example, the card.

For this reason, the related-art technology only makes it possible to synthesize videos that are produced in advance. In other words, the related-art technology only makes it possible to reproduce predetermined movements provided for the respective types of cards. Thus, with the related-art technology, it is not possible to provide a high-precision, high-value-added image or video.

Also, with the virtual image display system disclosed in non-patent document 1, it is not possible to change a virtual image once it is displayed. In other words, with the disclosed virtual image display system, it is not possible to change an image according to an external environmental change. With the related-art technology of patent document 2, since an image is displayed with reference to a position of, for example, a card including identification information, an image can be displayed only in a limited manner. For example, with the related-art technology, it is not possible to display a three-dimensional image.

Further, with the related-art digital watermark technology, if information is embedded in a part of an image, it is not possible to identify the part of the image where the information is embedded. Therefore, it is necessary to embed information in the entire image. For example, with the related-art digital watermark technology, it is not possible to embed information only for an object (e.g., a flower or a person) in an image displayed on a television and therefore it is necessary to obtain information for all objects in the displayed image. This in turn makes it necessary for the user to obtain even unnecessary information. Also, to detect a digital watermark embedded in an entire television screen with a lens of, for example, a cell phone, it is necessary to take an image of the television screen from a fairly distance position.

One object of the present invention is to provide an invisible information embedding apparatus, an invisible information detecting apparatus, an invisible information embedding method, an invisible information detecting method, and a storage medium that make it possible to solve or reduce one or more problems of the related-art technologies, and thereby make it possible to efficiently obtain information and provide a high-precision, high-value-added image.

Means for Solving the Problems

To solve the above problems, an aspect of the present invention provides an invisible information embedding apparatus for embedding invisible information at a position in an obtained image. The invisible information embedding apparatus includes an image analysis unit configured to obtain object information and positional information of an object included in the image, an embedding target image determining unit configured to determine whether the image is an embedding target based on the object information obtained by the image analysis unit, and an image synthesizing unit configured to combine the image with the invisible information based on the determination result of the embedding target image determining unit.

To solve the above problems, an aspect of the present invention provides an invisible information detecting apparatus for detecting invisible information in an obtained image. The invisible information detecting apparatus includes an invisible information extracting unit configured to extract the invisible information from the image, an invisible information analysis unit configured to analyze the invisible information extracted by the invisible information extracting unit to obtain supplemental information of an object in the image, and a display information generating unit configured to generate display information to be displayed on a screen based on the supplemental information obtained by the invisible information analysis unit.

Advantageous Effect of the Invention

The present invention makes it possible to efficiently obtain information and provide a high-precision, high-value-added image.

BRIEF DESCRIPTION OF THE DRAWINGS

FIG. 9 is a drawing used to describe patterns of a low-frequency part or a high-frequency part;

FIG. 13B is a table used to describe an exemplary method of embedding a code using a high-frequency part;

FIG. 19 is a table illustrating exemplary comparison results;

BEST MODE FOR CARRYING OUT THE INVENTION

According to an aspect of the present invention, invisible information (marker), which is processed to make it undetectable with the naked eye, is embedded in a part of an image or a video picture displayed on a screen or in a part of a print medium such as paper, a postcard, a poster, or a card; the part of the image, the video picture, or the print medium is shot (or captured) by an imaging unit such as a digital camera or a camera of a mobile terminal; and the shot image or video picture is input into a personal computer or a mobile terminal and processed using, for example, a filter to detect the embedded marker. Another aspect of the present invention provides a marker embedding method and a marker detecting method combined with image processing that make it possible to detect an embedded marker even with a device such as a mobile terminal with limited capacity and performance. Still another aspect of the present invention makes it possible to obtain value-added information corresponding to a shot image or video picture from detected marker information.

An invisible information embedding apparatus, an invisible information detecting apparatus, an invisible information embedding method, an invisible information detecting method, and a storage medium according to preferred embodiments of the present invention are described below with reference to the accompanying drawings. In the embodiments described below, "image" may indicate an individual image such as a photograph as well as consecutive images or frames in a video.

Figure 1:
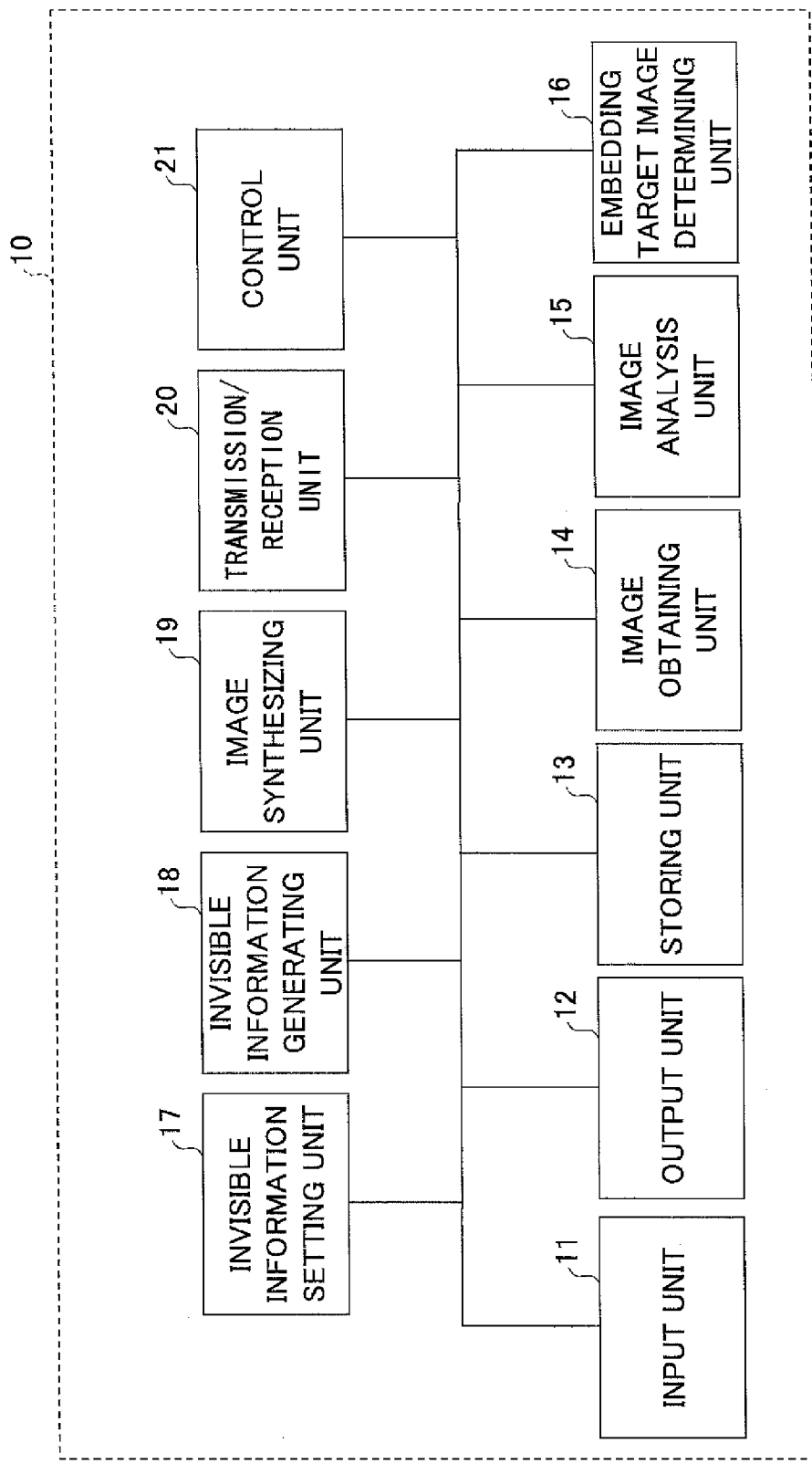
FIG. 1 is a drawing illustrating an exemplary functional configuration of an invisible information embedding apparatus according to an embodiment.

An exemplary functional configuration of an invisible information embedding apparatus according to an embodiment is described below. FIG. 1 is a drawing illustrating an exemplary functional configuration of an invisible information embedding apparatus according to an embodiment.

As illustrated in FIG. 1, an invisible information embedding apparatus 10 includes an input unit 11, an output unit 12, a storing unit 13, an image obtaining unit 14, an image analysis unit 15, an embedding target image determining unit 16, an invisible information setting unit 17, an invisible information generating unit 18, an image synthesizing unit 19, a transmission/reception unit 20, and a control unit 21.

The input unit 11, for example, receives user instructions for starting and terminating processes related to various requests such as an image acquisition request, an image analysis request, an embedding target image determination request, an embedding information setting request, an embedding information generation request, an image synthesis request, and a transmission/reception request. The input unit 11 may include a keyboard and a pointing device such as a mouse in a case of a general-purpose computer such as a personal computer, or operation buttons in a case of a mobile terminal. The input unit 11 may also include a function for inputting an image or a video picture shot by an imaging unit such as a digital camera. The imaging unit may be provided in an invisible information detecting apparatus 30 or provided as an external apparatus.

The output unit 12 outputs information input via the input unit 11 or a result of a process performed based on the input information. For example, the output unit 12 outputs, on a display screen or as audio, an obtained image, an image analysis result, an embedding target image determination result, set invisible information, generated invisible information, a synthesized image where invisible information is embedded, and various processing results. The output unit 12 may be implemented by, for example, a display and/or a speaker.

The output unit 12 may also include a printing function that prints output information as described above on a print medium such as paper, a postcard, or a poster for the user.

The storing unit 13 stores various types of information that is necessary in the present embodiment, and various data used during an embedding process or produced as a result of the embedding process. For example, the storing unit 13 stores one or more images or video pictures obtained by the image obtaining unit 14. Also, the storing unit 13 stores analysis results of the image analysis unit 15, determination results of the embedding target image determining unit 16, information set by the invisible information setting unit 17, embedding information generated by the invisible information generating unit 18, and images synthesized by the image synthesizing unit 19. Also, the storing unit 13 is capable of reading stored data as necessary.

The image obtaining unit 14 obtains images and video pictures where information is to be embedded. Those images and video pictures may be obtained by an imaging unit such as a camera, and may be used, for example, for posters, photographs, cards, and stickers. The image obtaining unit 14 may also be configured to obtain images and video pictures, which are taken by an external apparatus connected to a communication network and stored in a database, via the transmission/reception unit 20. Further, the image obtaining unit 14 may obtain images taken by the user with, for example, a camera, via the input unit 11.

The image analysis unit 15 analyzes an image or video picture obtained by the image obtaining unit 14 to determine information included in the image or video picture. For example, the image analysis unit 15 obtains object information and positional information of objects in the image or video picture. The object information may include the types of the objects, and the positional information may include coordinates indicating parts (positions or areas) of the image where the objects are located, and/or how the objects are moving in the video picture. When an object is a person, the image analysis unit 15 may also perform face detection based on the characteristics of the face of the person, digitize the characteristics of the face, and identify the person based on the digitized characteristics.

Based on the analysis results of the image analysis unit 15, the embedding target image determining unit 16 determines whether the objects in the image are embedding targets for which invisible information is to be embedded. The embedding target image determining unit 16 may be configured to determine whether the objects are embedding targets based on embedding determination information set in advance by the user and stored in the storing unit 13. Alternatively, the embedding target image determining unit 16 may be configured to search the storing unit 13 to find supplemental information associated with an object, and determine that the object is an embedding target if the supplemental information is found.

When, for example, an analysis result of the image analysis unit 15 indicates that an image of a personal computer is included in an analyzed image, the embedding target image determining unit 16 determines whether supplemental information for the personal computer is stored in the storing unit 13, and if the supplemental information for the personal computer is found, determines that the image of the personal computer is an embedding target. Information to be embedded (i.e., supplemental information) may be set, for example, by the invisible information setting unit 17, and the set information may be stored in the storing unit 13.

When plural objects are in an image, the embedding target image determining unit 16 outputs the respective objects as embedding targets. Here, when plural objects are in an image, all the objects may be set as embedding targets, or at least one of the objects may be set as an embedding target. For example, embedding targets may be set based on detailed embedding information stored in the storing unit 13 such as predetermined priority levels of objects, the positions of display areas of objects in the entire screen, or in the case of a video picture, periods of time for which objects are displayed.

The invisible information setting unit 17 sets supplemental information to be embedded based on the object information. For example, when the object information indicates a wallet or a dress, the brand name or product name, the price, and the address of a home page of the wallet or dress may be set as supplemental information; when the object information indicates a person, the name, age, sex, height, hobbies, and careers of the person may be set as supplemental information; and when the object information indicates a book, the title, author, publication date, price, author information of the book may be set as supplemental information. Supplemental information set by the invisible information setting unit 17 may include images and videos.

The invisible information setting unit 17 also sets the manner in which information is added. For example, the invisible information setting unit 17 may set the type of information, such as encrypted character strings, patterns, symbols, or code information, for expressing the supplemental information, and may also set the display size of the supplemental information.

When the supplemental information is expressed by code information, a database defining the code information is preferably provided in an invisible information detecting apparatus. This configuration makes it possible to select the type of information that is suitable to express supplemental information to be embedded in an embedding target image based on the type of the embedding target image.

The invisible information generating unit 18 generates embedding information to be embedded in an embedding target image. The embedding information may be generated as character information or code information. As the code information, for example, a two-dimensional bar code such as QR code may be used. However, the code information is not limited to QR code. For example, bar codes such as JAN code, ITF code, NW-7, CODE39, CODE128, UPC, PDF417, CODE49, Data Matrix code, and Maxi code may also be used.

Also, to make embedded information less visible with respect to an image actually provided to the user, the invisible information generating unit 18 generates an image representing the embedding information using both low-frequency parts and high-frequency parts, only low-frequency parts, or only high-frequency parts. Here, a low-frequency part indicates a part or an area whose brightness is made lower than the brightness of the corresponding part of the original image where invisible information is to be embedded, and a high-frequency part indicates a part or an area whose brightness is made greater than the brightness of the corresponding part of the original image. Details of invisible information generated by the invisible information generating unit 18 are described later. The invisible information generating unit 18 obtains coordinates indicating a position in an image at which invisible information is to be embedded.

Here, embedding information for an object is preferably embedded at or near a position where the object is displayed in an image. Therefore, in the present embodiment, images to be embedded are combined with a target image based on the positional information of objects obtained by the image analysis unit 15. Thus, according to the present embodiment, instead of embedding one set of information for an entire image, multiple sets of invisible information are embedded in appropriate positions.

The image synthesizing unit 19 synthesizes an image by embedding invisible information generated by the invisible information generating unit 18 at the corresponding positions in a target image based on the object information and the positional information (e.g., coordinates) of objects obtained by the image analysis unit 15.

Also, when embedding invisible information for an object in a video, the image synthesizing unit 19 changes positions where the invisible information is embedded according to the movement of the object in the video being played. That is, the image synthesizing unit can synthesize images for respective target images input serially and display the synthesized images in sequence.

The transmission/reception unit 20 is an interface for obtaining desired external images (shot images and synthesized images) and executable programs for implementing an invisible information embedding process of the present embodiment from an external apparatus connected via a communication network. The transmission/reception unit 20 can also transmit various types of information generated in the invisible information embedding apparatus 10 to an external apparatus.

The control unit 21 controls the entire invisible information embedding apparatus 10. For example, the control unit 21 controls processes such as acquisition and analysis of images, determination of embedding target images, invisible information setting, and image synthesis according to, for example, instructions input by the user via the input unit 21. Invisible information may be set and generated by the invisible information setting unit 17 and the invisible information generating unit 18 in advance and stored in the storing unit 13.

Figure 2:
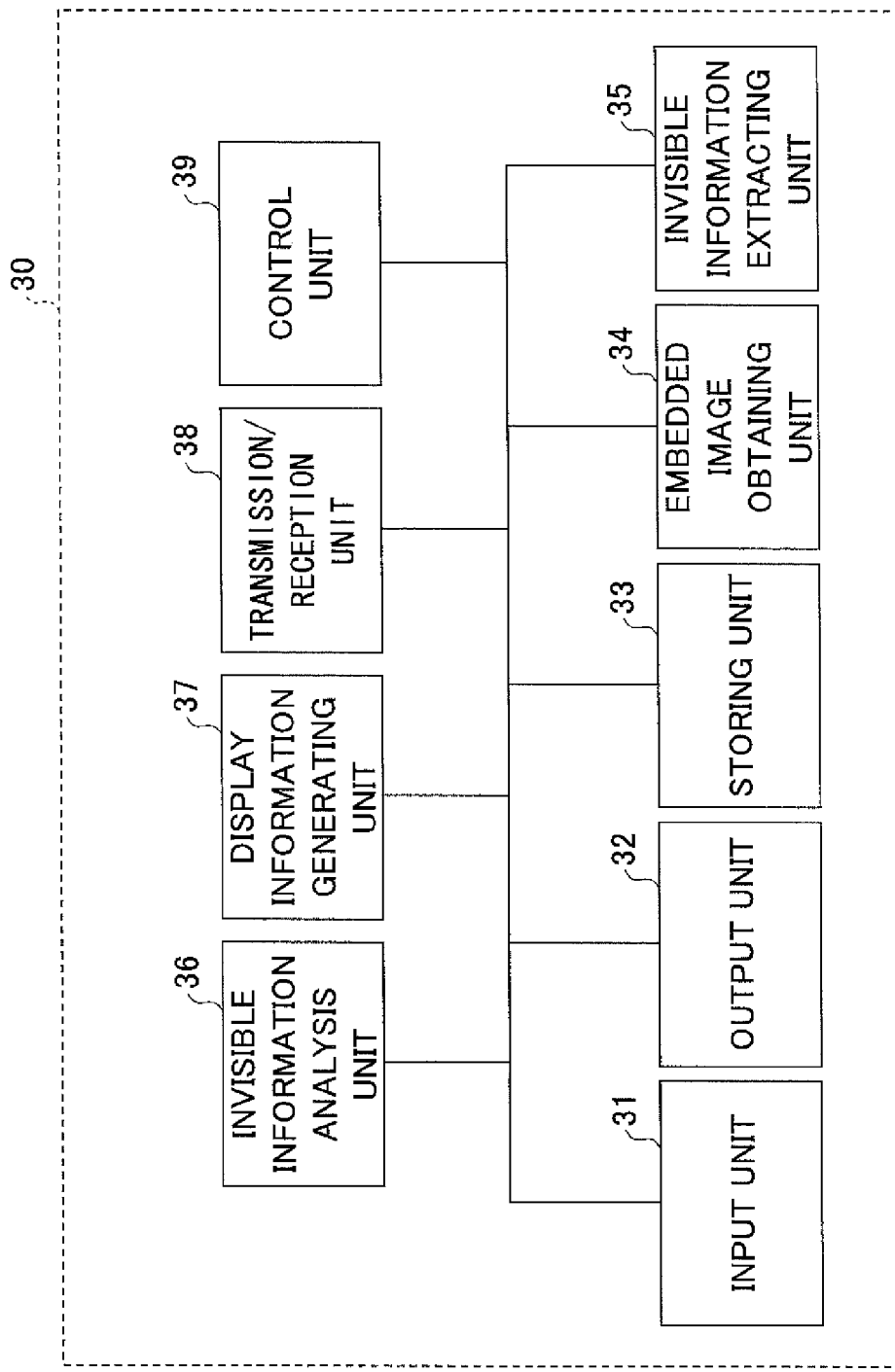
FIG. 2 is a drawing illustrating an exemplary functional configuration of an invisible information detecting apparatus according to an embodiment.

An exemplary functional configuration of an invisible information detecting apparatus according to an embodiment is described below. FIG. 2 is a drawing illustrating an exemplary functional configuration of an invisible information detecting apparatus according to an embodiment.

As illustrated in FIG. 2, an invisible information detecting apparatus 30 includes an input unit 31, an output unit 32, a storing unit 33, an embedded image obtaining unit 34, an invisible information extracting unit 35, an invisible information analysis unit 36, a display information generating unit 37, a transmission/reception unit 38, and a control unit 39.

The input unit 31, for example, receives user instructions for starting and terminating processes related to various requests such as an embedded image acquisition request, an invisible information extraction request, an invisible information analysis request, a display information generation request, and a transmission/reception request. The input unit 31 may include a keyboard and a pointing device such as a mouse in a case of a general-purpose computer such as a personal computer, or operation buttons in a case of a mobile terminal. The input unit 31 may also include a function for inputting an image or a video picture shot by an imaging unit such as a digital camera. The imaging unit may be provided in the invisible information detecting apparatus 30 or provided as an external apparatus.

The input unit 31 is also capable of obtaining embedded images form print media such as paper, a postcard, a poster, a photograph, and a card. In this case, the input unit 31 may include a function for capturing data using, for example, an imaging unit such as a camera or a scanner.

The output unit 32 outputs information input via the input unit 31 or a result of a process performed based on the input information. For example, the output unit 32 outputs supplemental information that is provided for objects in an image or a video picture and obtained by the display information generating unit 37. The output unit 32 may be implemented by, for example, a display and/or a speaker.

The output unit 32 may also include a printing function that prints output information such as supplemental information of objects on a print medium such as paper for the user.

The storing unit 33 stores various types of information that is necessary in the present embodiment, and various data used during an invisible information detecting process or produced as a result of the invisible information detecting process. For example, the storing unit 33 stores embedded images obtained by the embedded image obtaining unit 34, invisible information (markers) obtained by the invisible information extracting unit 35, invisible information analyzed by the invisible information analysis unit 36, and display information generated by the display information generating unit 37.

The storing unit 33 may also store information related to data analyzed by the invisible information analysis unit 36. For example, when invisible information is code information (such as character code or two-dimensional code), the storing unit 33 may store various data related to the code information (e.g., detailed information such as characters, a video, an image, or audio for an object corresponding to the code information; and the size, color, time, position, and movement for displaying the detailed information on a screen). Further, the storing unit 33 is capable of reading stored data when code is obtained and at any time when necessary.

The embedded information obtaining unit 34 obtains embedded images from the storing unit 33 and from an external apparatus via a communication network and the transmission/reception unit 38. Embedded images may include videos.

The invisible information extracting unit 35 extracts invisible information from embedded images. For example, the invisible information extracting unit 35 performs frequency filtering with a predetermined frequency on an input embedded image, and thereby obtains invisible information embedded in the image. When plural sets of invisible information are present in an image, the invisible information extracting unit 35 extracts all sets of the invisible information.

The invisible information extracting unit 35 also obtains invisible information position information indicating a position from which invisible information is extracted. The invisible information extracting unit 35 stores obtained information in the storing unit 33.

The invisible information analysis unit 36 analyzes invisible information obtained by the invisible information extracting unit 35 to determine added-value data included in the invisible information. In the present embodiment, the invisible information analysis unit 36 may include a reading function such as a bar-code reader for reading a bar code. For example, when invisible information is a two-dimensional bar code, the invisible information analysis unit 36 reads the two-dimensional bar code to obtain information, searches the storing unit 33 or an external apparatus (e.g., a database server) connected via a communication network using the obtained information (e.g., a code ID) as a key to find supplemental information corresponding to the key, and obtains the supplemental information if found.

The display information generating unit 37 generates display information for displaying the results obtained by the invisible information analysis unit 36 on a screen. The display information may be displayed, for example, in a separate window on a screen or above the corresponding object displayed on the screen. Alternatively, the generated information may be output as an audio message.

The display information generating unit 37 may visualize obtained invisible information and display the visualized information as is. Instead, the display information generating unit 37 may obtain supplemental information corresponding to the invisible information from the storing unit 33 or an external apparatus, and display the obtained supplemental information.

When displaying the results obtained by the invisible information analysis unit 36, the display information generating unit 37 may generate display information based on display parameters such as size, color, time, position, and movement that are set for the supplemental information obtained from the storing unit or an external apparatus based on, for example, a code ID. When an object corresponding to the display information is moving in a video, the display information generating unit 37 may change the positions of the display information according to the movement of the object, or may fix the position of the display information at the initial position.

The transmission/reception unit 38 is an interface for obtaining desired external images (e.g., shot images) and executable programs for implementing an invisible information detecting process of the present embodiment from an external apparatus connected via a communication network. The transmission/reception unit can also transmit various types of information generated in the invisible information detecting apparatus 30 to an external apparatus.

The control unit 39 controls the entire invisible information detecting apparatus 30. For example, the control unit 39 controls processes such as acquisition of embedded images, extraction of invisible information, analysis of invisible information, and generation of display information according to, for example, instructions input by the user via the input unit 31.

The above described configurations make it possible to efficiently obtain information and provide a high-precision, high-value-added image.

Next, exemplary operations of the invisible information analysis unit 36 in obtaining supplemental information are described below. As described above, when information obtained from invisible information is a code ID, the invisible information analysis unit 36 searches the storing unit 33 or an external apparatus (e.g., a database server) connected via a communication network using the code ID as a key to obtain supplemental information corresponding to the key.

More specifically, when the invisible information detecting apparatus 30 is a stand-alone apparatus, the invisible information analysis unit 36 searches the storing unit 33 using the code ID obtained from invisible information as a key to obtain supplemental information. Meanwhile, when the invisible information detecting apparatus 30 is a networked apparatus connected to an external apparatus via a communication network, the invisible information analysis unit 36 accesses the external apparatus using the code ID obtained from invisible information as a key to find and obtain supplemental information corresponding to the code ID from data stored in the external apparatus.

An invisible information embedding process and an invisible information detecting process performed by the invisible information embedding apparatus 10 and the invisible information detecting apparatus 30 may be implemented by computer-executable programs (invisible information embedding program and invisible information detecting program). Such programs may be stored in a storage medium such as a CD-ROM and installed in, for example, a general-purpose personal computer or a server.

Figure 3:
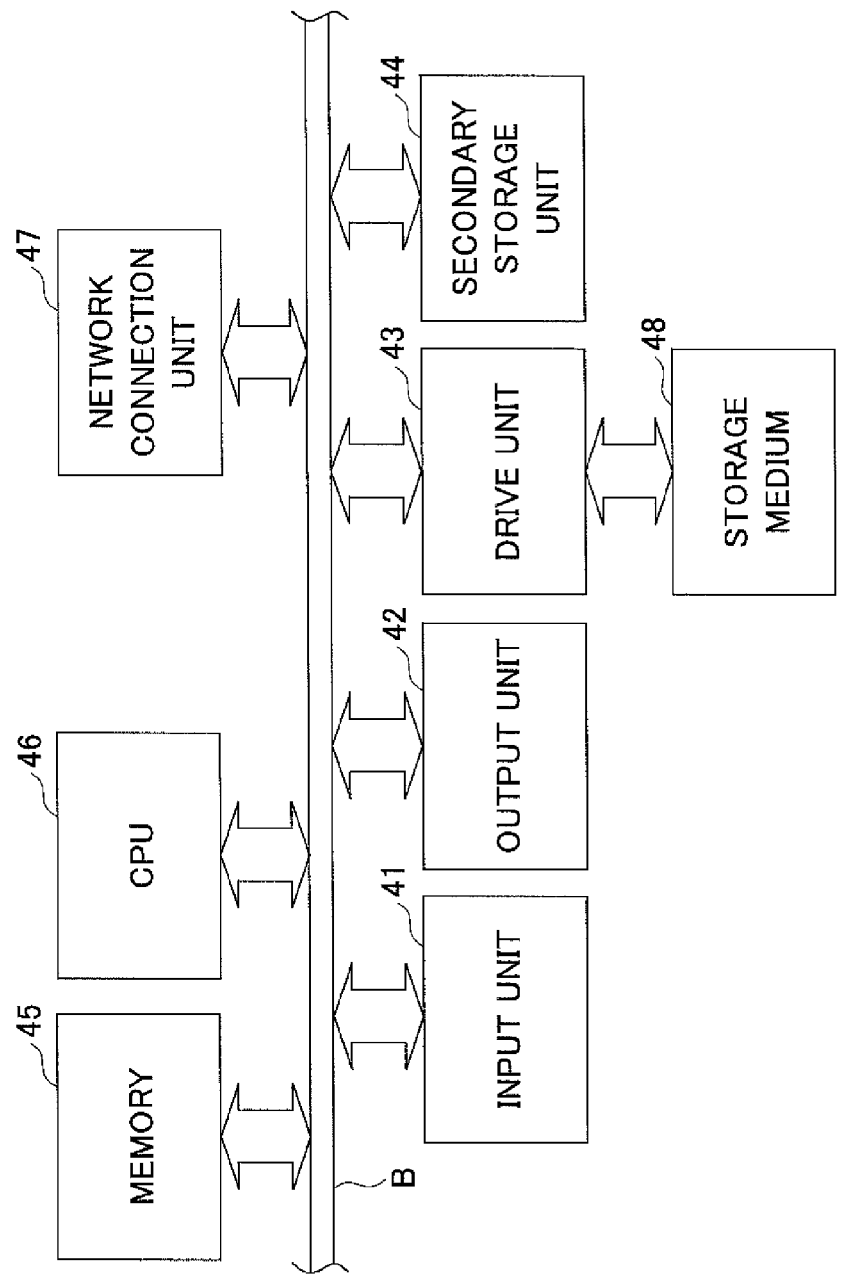
FIG. 3 is a drawing illustrating an exemplary hardware configuration for implementing an invisible information embedding process and an invisible information detecting process according to an embodiment.

An exemplary hardware configuration of a computer for implementing an invisible information embedding process and an invisible information detecting process according to the present embodiment is described below. FIG. 3 is a drawing illustrating an exemplary hardware configuration for implementing an invisible information embedding process and an invisible information detecting process according to the present embodiment.

A computer illustrated in FIG. 3 includes an input unit 41, an output unit 42, a drive unit 43, a secondary storage unit 44, a memory 45, a central processing unit (CPU) 46 for performing various control processes, and a network connection unit 47 that are connected to each other via a system bus B.

The input unit 41 includes a keyboard and a pointing device, such as a mouse, used by the user to input operation signals such as a command to execute a program. The input unit 41 also includes an image input unit for inputting images shot or taken by an imaging unit such as a camera.

The output unit 42 includes a display for displaying various data and windows used to operate the computer to perform processes of the present embodiment. The CPU 46 displays progress status and processing results of programs on the display according to a control program.

According to the present embodiment, executable programs to be installed in the computer may be provided via, for example, a portable storage medium 48 such as a USB memory or a CD-ROM. The storage medium 48 storing the programs is mountable on the drive unit 43. The programs stored in the storage medium 48 are installed via the drive unit 43 into the secondary storage unit 44.

The secondary storage unit 44, for example, is a hard disk and stores executable programs of the present embodiment and control programs provided for the computer. The stored execution programs and control programs can be retrieved from the secondary storage unit 44 as necessary.

The memory 45 stores, for example, the execution programs retrieved by the CPU 46 from the secondary storage unit 44. The memory 45 includes, for example, a read only memory (ROM) and a random access memory (RAM).

The CPU 46 performs various operations and data input/output from and to other hardware components according to control programs such as an operating system (OS) and the executable programs stored in the memory 45, and thereby controls the entire computer to perform various processes for displaying synthesized images. Information necessary for the execution of the programs may be obtained from the secondary storage unit 44, and information resulting from the execution of the programs may be stored in the secondary storage unit 44.

The network connection unit 47 connects the computer to a communication network and thereby allows the computer to obtain executable programs from another terminal connected to the communication network and to send the results obtained by executing the programs or the programs themselves to another terminal.

The above hardware configuration makes it possible to perform an invisible information embedding process and an invisible information detecting process according to the present embodiment. Thus, an invisible information embedding process and an invisible information detecting process according to the present embodiment can be easily implemented by, for example, a general-purpose personal computer where the above programs are installed.

An exemplary invisible information embedding process and an exemplary invisible information detecting process are described below.

Figure 4:
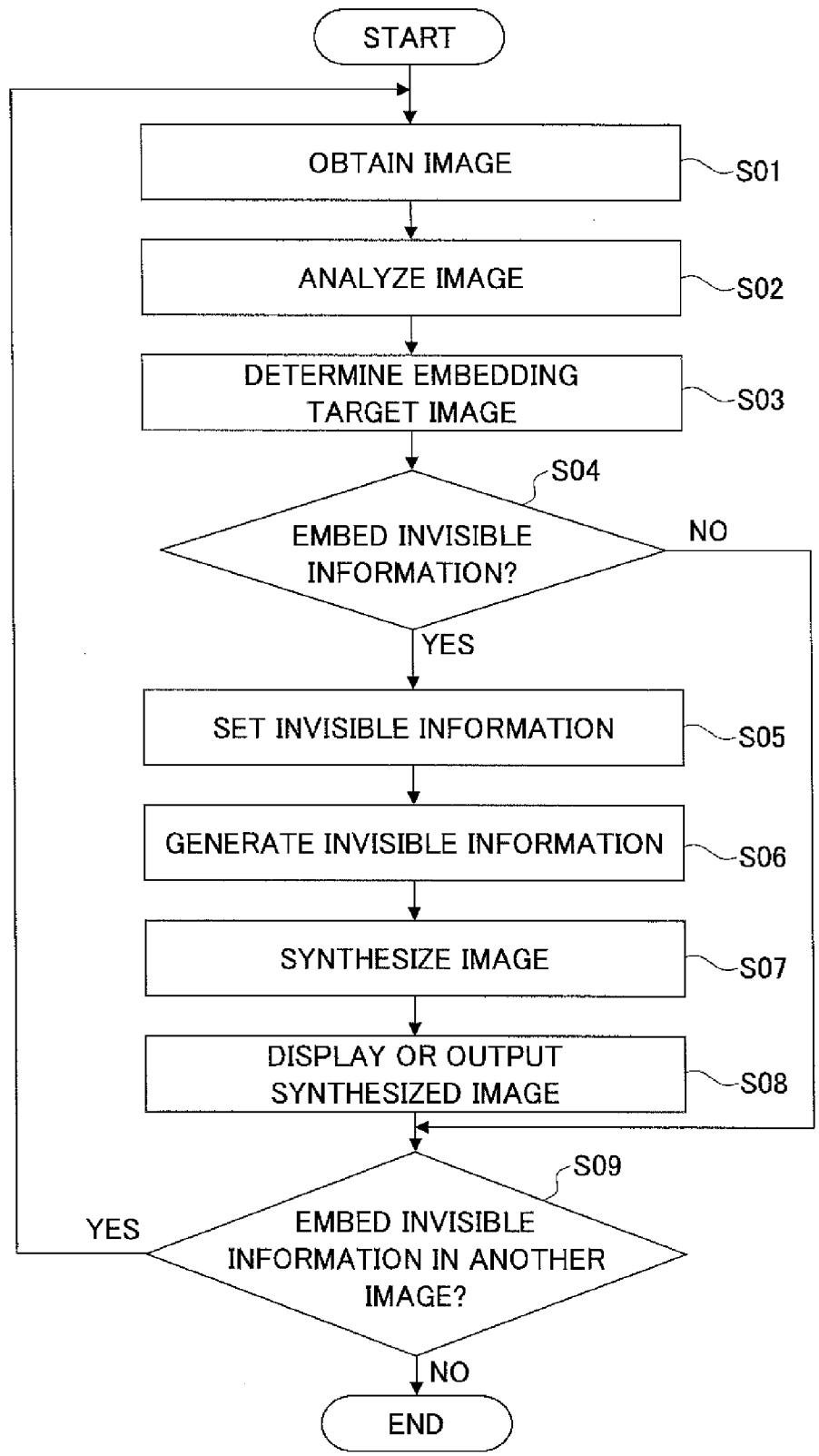
FIG. 4 is a flowchart illustrating an exemplary invisible information embedding process according to an embodiment.

First, an invisible information embedding process according to the present embodiment is described. FIG. 4 is a flowchart illustrating an exemplary invisible information embedding process according to the present embodiment.

In the invisible information embedding process of FIG. 4, an image shot by an imaging unit such as a camera is obtained (S01), and the obtained image is analyzed (S02) to obtain object information and positional information of an object(s) in the image.

Next, whether the image is an embedding target image is determined based on the information obtained in step S02 (S03), and whether to embed invisible information (marker) for the object is determined (S04). When it is determined to embed invisible information (YES in S04), invisible information is set (S05), and invisible information to be embedded in the image is generated based the set invisible information (S06).

Next, the invisible information generated in step S06 is embedded at the corresponding position in the image to obtain a synthesized image (S07), and the synthesized image is displayed on an output unit such as a display or output as data (S08).

After step S08 or when it is determined to not embed invisible information in step S04 (NO in S04), whether to embed invisible information in another image is determined (S09). When it is determined to embed invisible information in another image (YES in S09), the process returns to step S01 and the subsequent steps are repeated. Meanwhile, when it is determined to not embed invisible information in another image (NO in S09), the invisible information embedding process is terminated.

Figure 5:
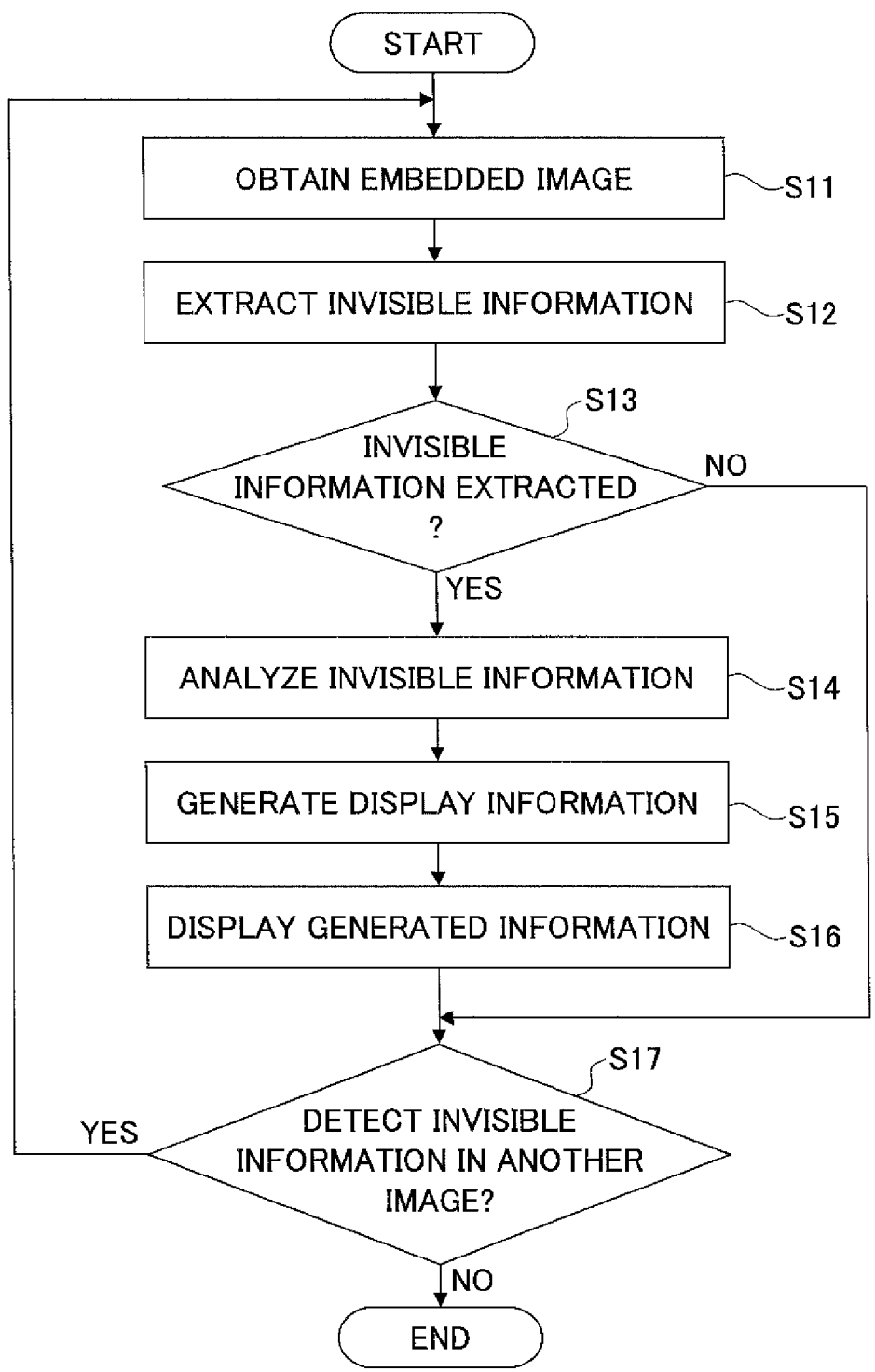
FIG. 5 is a flowchart illustrating an exemplary invisible information detecting process according to an embodiment.

Next, an invisible information detecting process according to the present embodiment is described. FIG. 5 is a flowchart illustrating an exemplary invisible information detecting process according to the present embodiment.

In the invisible information detecting process of FIG. 5, an embedded image is obtained (S11), and invisible information is extracted from the obtained image (S12).

Next, whether invisible information has been extracted from the image in step S12 is determined (S13). When invisible information has been extracted (YES in S13), the invisible information is analyzed (S14). Next, display information to be displayed on a screen is generated based on information obtained as a result of analyzing the invisible information (S15), and the generated display information is displayed (S16).

Then, whether to detect invisible information in another image is determined (S17). If it is determined to detect invisible information in another image (YES in S17), the process returns to step S11 and the subsequent steps are. repeated. Meanwhile, when it is determined to not detect invisible information in another image (NO in S17), the invisible information detecting process is terminated.

The above described processes make it possible to efficiently obtain information and provide a high-precision, high-value-added image. The invisible information embedding/detecting process may be easily implemented by installing programs in a general-purpose personal computer.

Next, invisible information according to the present embodiment is described in detail. Examples of invisible information include characters, numerals, symbols, marks, patterns, colors, one-dimensional codes, and two-dimensional codes. In the descriptions below, a two-dimensional code is used as an example.

Figure 6:
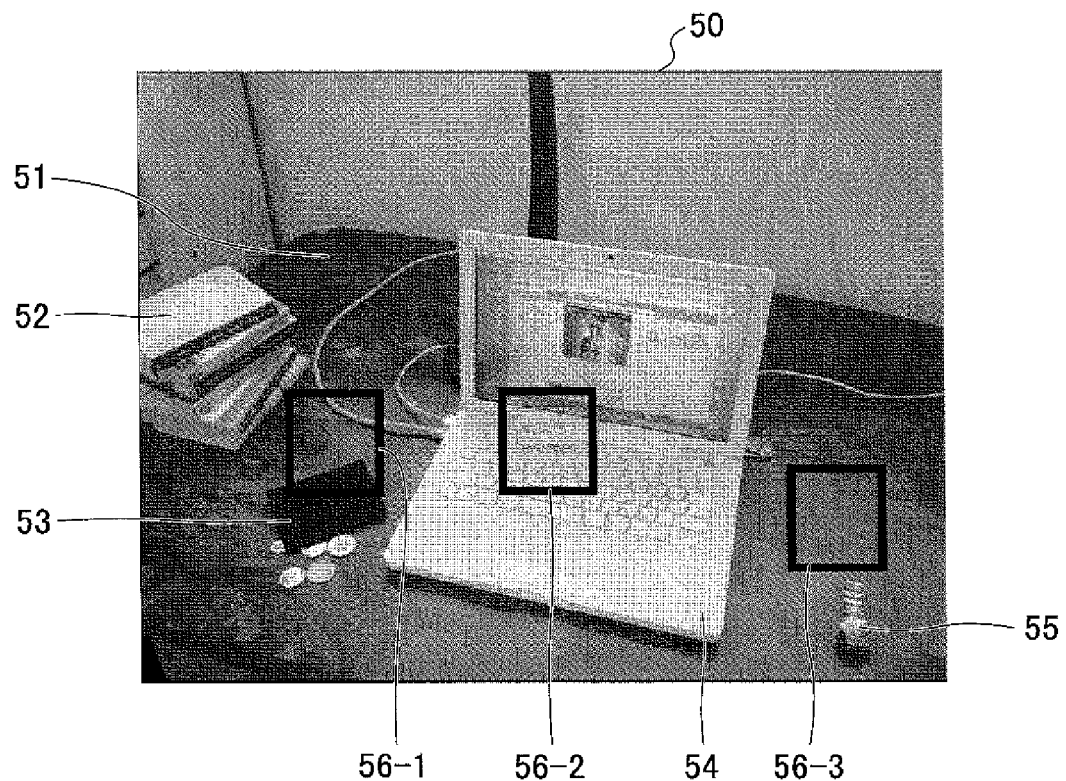
FIG. 6 is a drawing illustrating an exemplary image.

FIG. 6 is a drawing illustrating an exemplary image. In an image 50 illustrated in FIG. 6, a book 52, a purse 52, a notebook computer 54, and a wristwatch 55 are placed on a desk 51. In the present embodiment, the image analysis unit 15 obtains object information and positional information of these objects in the image. Here, it is assumed that the embedding target image determining unit 16 finds supplemental information for the purse 53, the notebook computer 54, and the wristwatch 55, and determines to generate invisible information for the purse 53, the notebook computer 54, and the wristwatch 55. Alternatively, the user may freely determine whether to generate invisible information and the type of invisible information to be generated.

In the example of FIG. 6, plural sets of invisible information 56-1 through 56-3 representing two-dimensional codes are superposed on the image at positions where the purse 53, the notebook computer 54, and the wristwatch 55 are displayed or in areas near the positions to generate a synthesized image.

Figure 7:
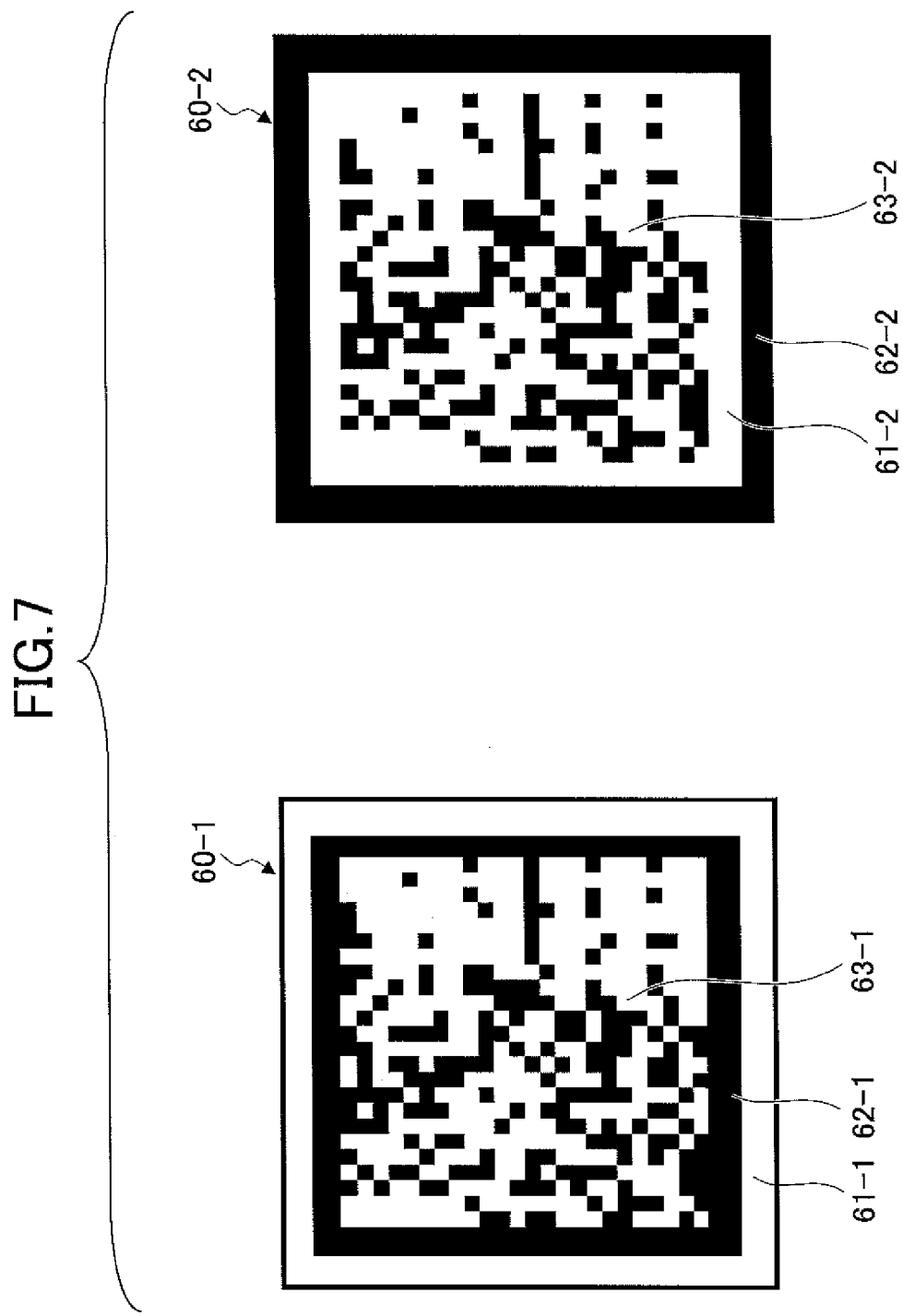
FIG. 7 is a drawing illustrating exemplary invisible information.

FIG. 7 is a drawing illustrating exemplary invisible information. FIG. 7 illustrates two sets of invisible information 60-1 and 60-2 representing two-dimensional codes. The invisible information 60-1 includes a low-frequency layer 61-1 as the outermost frame, a high-frequency layer 62-1 in the low-frequency layer 61-1, and a code part 63-1 in the high-frequency layer 62-1.

With the related-art technologies, when a code is embedded in a part of an image, it is not possible to determine the part of the image where the code is embedded. For this reason, in the related-art technologies, a code is embedded in the entire image. In the present embodiment, the code part 63-1 is surrounded by the low-frequency layer 61-1 and the high-frequency layer 62-1. Therefore, when one of the low-frequency layer 61-1 and the high-frequency layer 62-1 is drawn in one color such as black or in multiple colors different from the colors of the image, it is possible to cause the two-dimensional code to emerge from the image by performing frequency filtering at a given frequency (e.g., with a high-pass filter (HPF) or a low-pass filter (LPF)). Thus, this configuration makes it possible to extract a code area by performing filtering, and to efficiently read a two-dimensional code even when the two-dimensional code is embedded in a part of an image.

Meanwhile, the invisible information 60-2 includes a high-frequency layer 62-2 as the outermost frame, a low-frequency layer 61-2 in the high-frequency layer 62-2, and a code part 63-2 in the low-frequency layer 61-2. The invisible information 60-2 also provides advantageous effects similar to those provided by the invisible information 60-1.

An area where a code is embedded is preferably shaped like a square. However, an area where a code is embedded may have any other predefined shape such as a rectangular, a rhombus, or a circle.

For a two-dimensional code, information indicating its orientation is generally required. In the present embodiment, a two-dimensional code is embedded in an image such that the orientation of the two-dimensional code is aligned with the orientation of the image. For example, when shooting a picture displayed on a television screen with a camera of a mobile terminal, the mobile terminal is generally held such that its orientation matches the orientation of the television screen. Therefore, a two-dimensional code is embedded such that its orientation matches the orientation of the television screen. This makes it unnecessary to attach information indicating the orientation to a two-dimensional code. Thus, with this method, since the orientation of an image indicates the orientation of a two-dimensional code, it is not necessary to include orientation information in the two-dimensional code. This in turn makes it possible to increase the amount of information that can be included in a two-dimensional code. Also with this method, since it is not necessary to analyze the orientation information to detect a two-dimensional code, it is possible to efficiently detect the two-dimensional code. Thus, the present embodiment makes it possible to accurately detect invisible information.

Figure 8:
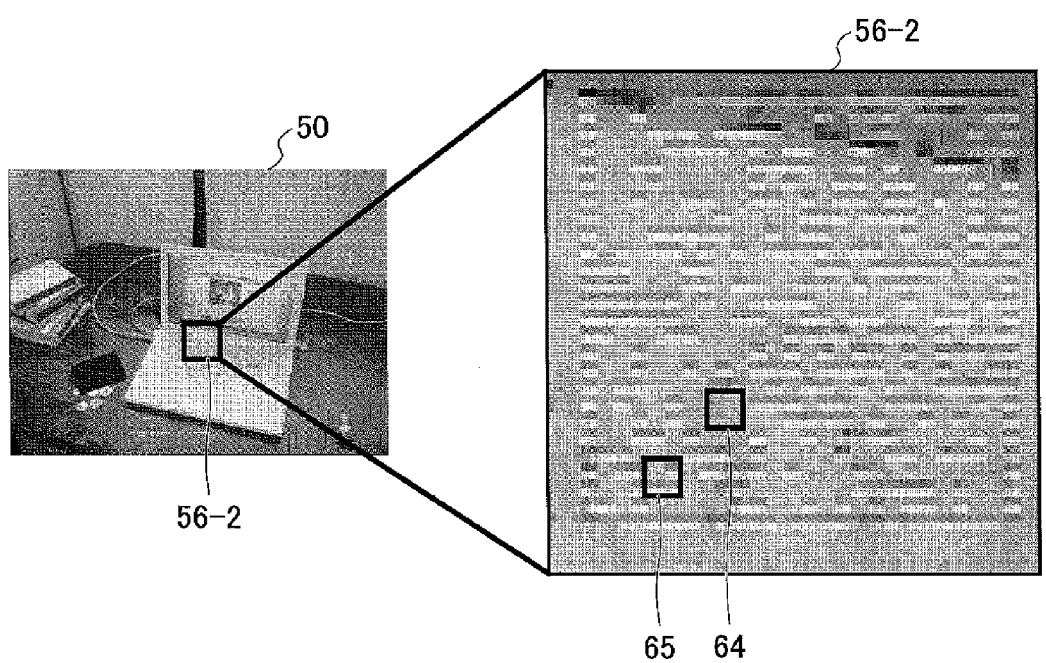
FIG. 8 is a drawing used to describe an example of embedded supplemental information.

Next, exemplary supplemental information embedded by the image synthesizing unit 19 is described. FIG. 8 is a drawing used to describe an example of embedded supplemental information. In the descriptions below, it is assumed that a two-dimensional code is embedded as supplemental information. An original image 50 of FIG. 8 is the same as the image 50 of FIG. 6, and therefore its descriptions are omitted here. In the image 50 of FIG. 8, an invisible area 56-2 is provided for the notebook computer. As illustrated by the enlarged view, the invisible area 56-2 includes low-frequency parts 64 and high-frequency parts 65 are arranged according to a predetermined rule in a predetermined area (e.g., a square). Here, each low-frequency part 64 represents "0" and each high-frequency part 65 represents "1", and a code is represented by the low-frequency parts 64 and the high-frequency parts 65. In the high-frequency part 65, pixels with a deep color and pixels with a light color are arranged alternately such that the high-frequency part 65 as a whole represents a color of the original image when seen from a distance.

"Low frequency" and "high frequency" in the present embodiment are described below. Generally, there are two types of frequencies: frequency with respect to time (temporal frequency) and frequency with respect to positions in space. In the present embodiment, "frequency" indicates spatial frequency unless otherwise mentioned. Spatial frequency is defined as "an inverse number of a cycle of pixel values with respect to a unit length".

In the present embodiment, the frequency of a high-frequency part may be set at, but is not limited to, a value between 0.2 and 2 [cycle/pixel] and the frequency of a low-frequency part may be set at, but is not limited to, a value between 0 and 1 [cycle/pixel] such that the frequency of the high-frequency part becomes greater than the frequency of the low-frequency part.

A pixel area or a grid (e.g., 4×4 pixels) representing a high-frequency part may be formed by cyclically repeating light and dark parts. For example, a grid may be formed in a vertical stripe pattern, a horizontal stripe pattern, or a checkered pattern as shown below (L=light, D=dark).

| |
|---|
| L L L L |
| D D D D |
| L L L L |
| D D D D |
| Or |
| L D L D |
| D L D L |
| L D L D |
| D L D L |

The brightness difference between the light parts and the dark parts is preferably greater than or equal to 10, more preferably greater than or equal to 50, and still more preferably greater than or equal to 100. In the present embodiment, the brightness difference indicates the difference in brightness between light parts and dark parts that are generated based on the brightness of the original image. However, the brightness difference may be defined in a different manner. For example, the brightness difference may be defined as the difference between the brightness of the original image and the brightness of the low-frequency parts or the high-frequency parts.

In this case, for example, the high-frequency parts may be defined as parts whose grayscale level is different from neighboring elements by about 15 or more in grayscale levels. More specifically, parts with a brightness difference of about 15 to about 35 may be used as high-frequency parts. An element may be composed of one or more pixels arranged in the vertical and horizontal directions. In the present embodiment, an element may be composed of 2×2 pixels.

Assume that the smallest brightness difference that an imaging unit such as a camera can detect is 15 and a human eye can easily detect a brightness difference greater than 35. Here, when a part of an image where invisible information is embedded is extremely dark or bright, it may be necessary to make the brightness difference greater than or equal to 35 to improve the detection accuracy of, for example, a camera. For this reason, in the present embodiment, the brightness difference of a code generated as invisible information is varied according to the brightness or lightness of a part of an image (i.e., a background) where the code is embedded and the capability of a camera used.

The size of pixels usable for supplemental information varies depending on, for example, the distance between an image and a person who looks at the image. Therefore, when the distance is about 1 m, the pixel size is preferably, but is not limited to, about 0.05 to about 2 mm; and when the distance is about 10 m, the pixel size is preferably, but is not limited to, about 0.5 mm to about 20 mm. Even when an image is seen from a longer distance, it is preferable to maintain substantially the same ratio between the pixel size and the distance.

When either low-frequency parts or high-frequency parts are embedded in an image, the low-frequency parts or the high-frequency parts preferably have a particular pattern with respect to a part of the image where they are embedded. FIG. 9 is a drawing used to describe patterns of a low-frequency part or a high-frequency part. Each cell in FIG. 9 (a) through (e) represents an element.

In the present embodiment, embedding information may be generated using low-frequency parts or high-frequency parts with predefined patterns as illustrated in FIG. 9: a checkered pattern (FIG. 9 (a)), a horizontal stripe pattern (FIG. 9 (b)), a vertical stripe pattern (FIG. 9 (c)), a right-slanting line pattern (FIG. 9 (d)), and a left-slanting line pattern (FIG. 9

(e)). However, patterns usable in the present embodiment are not limited to those illustrated in FIG. 9. For example, one or more of the patterns of FIG. 9 (a) through (e) may be combined.

Among the patterns of FIG. 9 (a) through (e), when they are embedded in an image on paper, the checkered pattern of FIG. 9 (a) is least visible and least noticeable on any background. Meanwhile, the slanting line patterns of FIG. 9 (d) and (e) are most noticeable.

However, when the checkered pattern of FIG. 9 (a) is embedded in an image or a video displayed on a monitor, since the pattern is too fine, a camera cannot detect the pattern as a high-frequency part. Therefore, in this case, it is necessary to form a high-frequency part using the horizontal stripe pattern or one of the slanting line patterns. As on paper, a high-frequency part with a slanting line pattern is most noticeable also on a monitor.

Thus, when invisible information is embedded in an original image (or a background image) using the patterns of FIG. 9 (a) through (e), it is possible to easily and accurately detect the embedded information by taking a picture of the low-frequency parts or the high-frequency parts with a camera. In addition to a case where only low-frequency parts or high-frequency parts are used, the patterns of FIG. 9 may be used in a case where both low-frequency parts and high-frequency parts are used.

Figure 10:
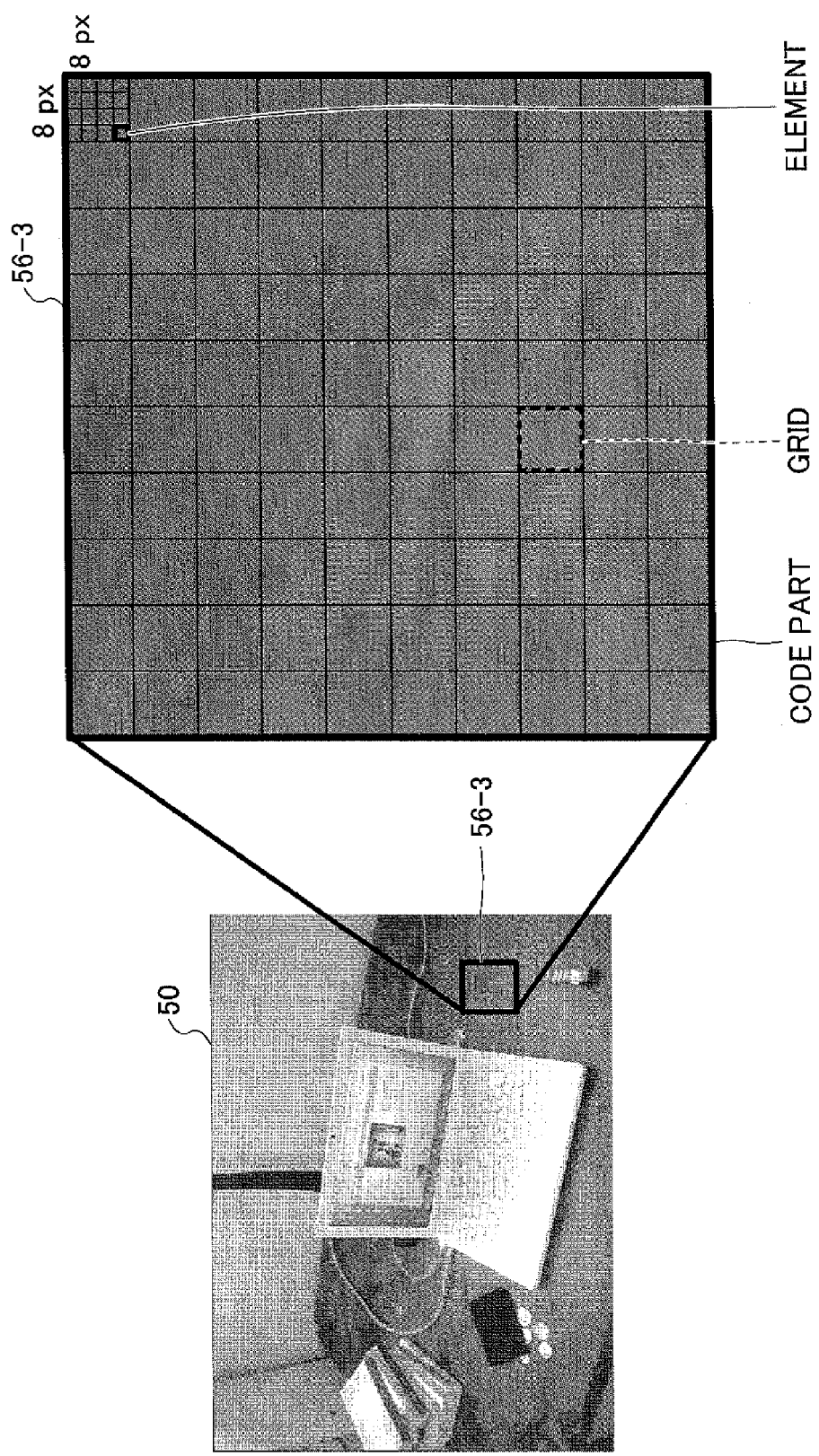
FIG. 10 is a drawing illustrating an example of an embedded code.

Next, an exemplary code embedded by the image synthesizing unit 19 is described. FIG. 10 is a drawing illustrating an example of an embedded code. The image 50 in FIG. 10 is the same as the image 50 in FIGS. 6 and 8, and therefore its descriptions are omitted here.

In the example of FIG. 10, the invisible information 56-3 is embedded for the wristwatch 55. First, a part of the image 50 where a code is to be embedded is extracted. The part is extracted in units of grids. For example, a grid has a square shape each side of which is composed of a predetermined number of pixels (in the example of FIG. 10, 8 pixels). In FIG. 10, one element is composed of 2×2 pixels.

The size of a grid is not limited to the example in FIG. 10. However, if the size of a grid is too small or too large, it is difficult to read a code made of 0s and 1s. Therefore, a grid is preferably a square each side of which is composed of 3 to 9 pixels. The shape of a grid is not limited to a square. For example, a grid may have a rectangular shape within the limit described above. The number of grids in the code part 63 is not limited. However, the code part 63 preferably has a square shape. In the example of FIG. 10, the code part 63 has a size of 10×10 grids.

Figure 11:
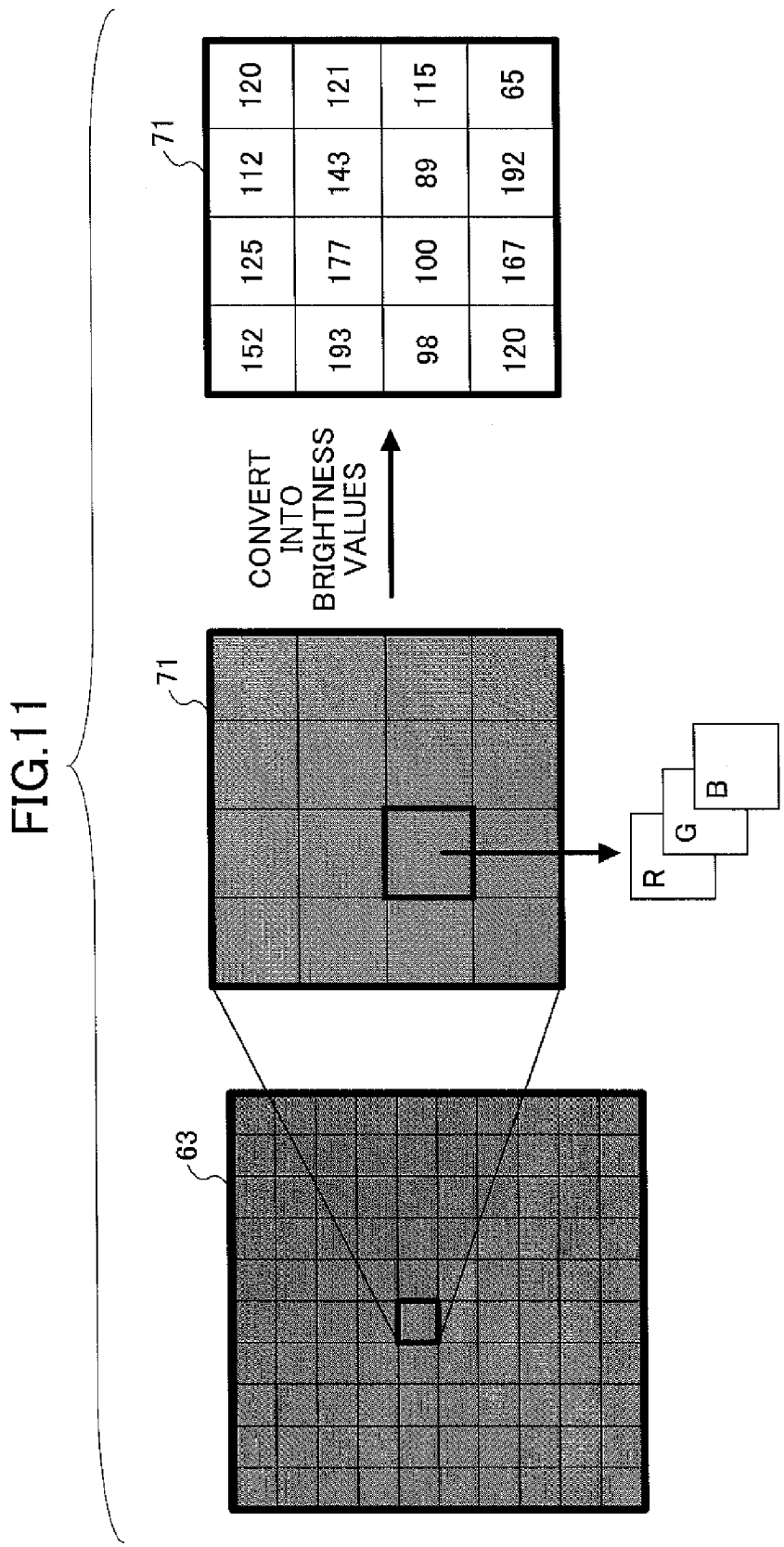
FIG. 11 is a drawing used to describe an exemplary method of embedding a code in a grid.

FIG. 11 is a drawing used to describe an exemplary method of embedding a code in a grid. As illustrated in FIG. 11, the invisible information generating unit 18 converts the pixels in a grid 71 of the code part 63, i.e., the invisible information 56-3, into brightness values. Each pixel is composed of red, green, and blue components. The brightness value of a pixel is represented by an average of lightness values (0-255) of the color components.

The brightness value of a pixel is defined as "brightness= (R+G+B)/3". For example, when R: 200, G: 100, and B: 0, the brightness value of the pixel is (200+100+0)/3=100.

Figure 12:
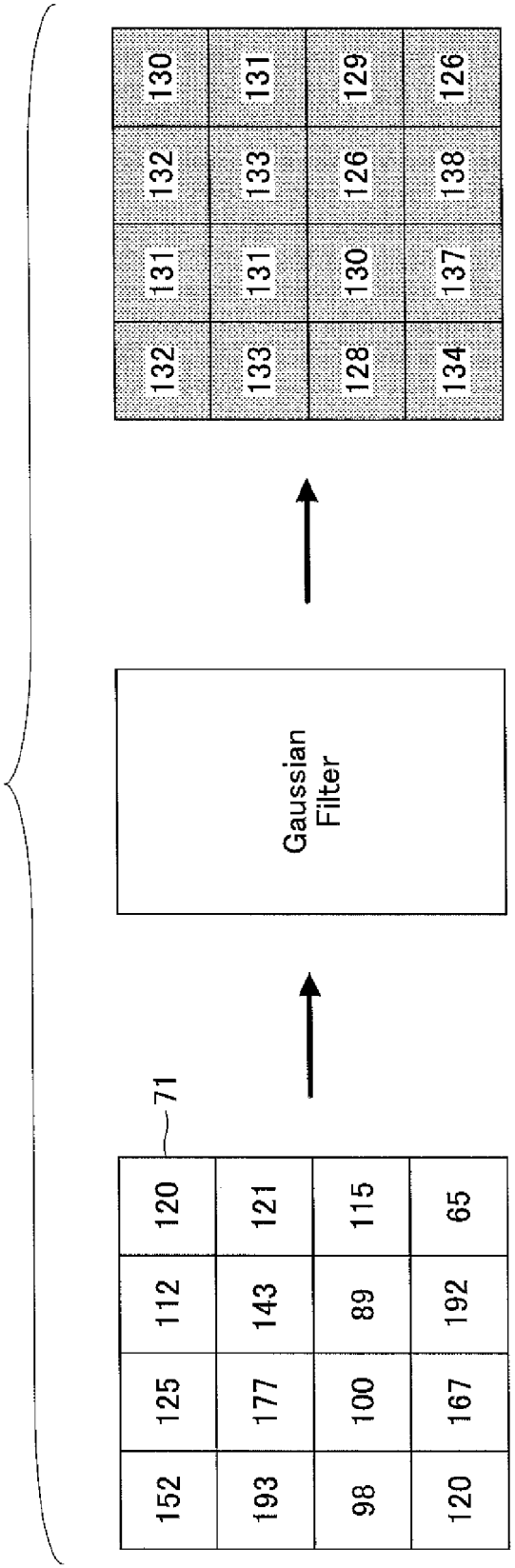
FIG. 12 is a drawing used to describe an exemplary method of embedding a code using a low-frequency part.

Next, an exemplary method of embedding a code using a low-frequency part is described. FIG. 12 is a drawing used to describe an exemplary method of embedding a code using a low-frequency part. When a grid is formed as illustrated in FIG. 12, the grid is filtered using, for example, a Gaussian filter (i.e., a blur filter is applied to the entire grid) to smooth the brightness values in the grid. In the example of FIG. 12, the brightness values in the grid 71 are smoothed to values around 130.

Figure 13A:
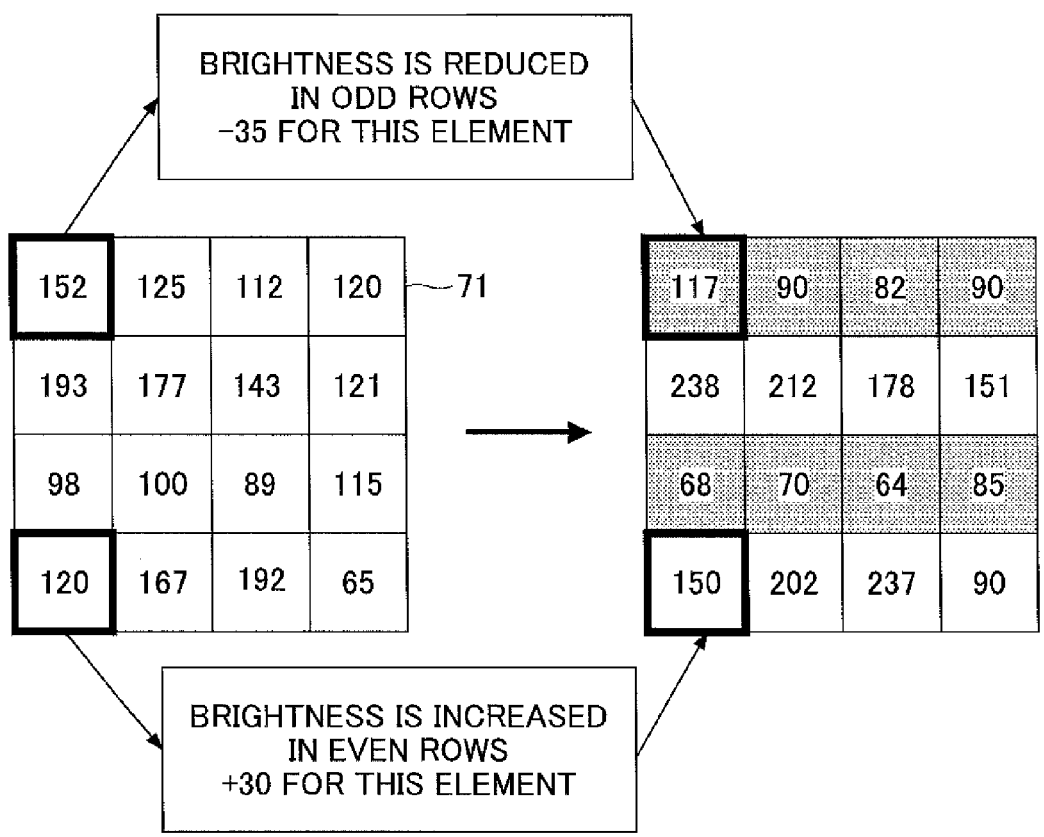
FIG. 13A is a drawing used to describe an exemplary method of embedding a code using a high-frequency part.

Next, an exemplary method of embedding a code using a high-frequency part is described. FIGS. 13A and 13B are drawings used to describe an exemplary method of embedding a code using a high-frequency part. In a grid illustrated in FIG. 13A, a stripe pattern is formed to embed a high-frequency part. For this purpose, the brightness of elements in even rows of a grid 71 is increased, and the brightness of elements in odd rows of the grid 71 is reduced. The increment or decrement in brightness is determined for each element according to a table as illustrated in FIG. 13B based on the brightness of the background. Setting the increment/decrement based on the brightness of the background makes it possible to efficiently generate embedding information and also makes it possible to make the embedding information less noticeable. The correspondence table illustrated in FIG. 13B may be stored, for example, in the storing unit 13.

For example, the element at the upper-left corner of the grid 71 of FIG. 13A is in an odd row, and therefore its brightness is decreased. According to the correspondence table of FIG. 13B, "35" is subtracted from "152" to obtain "117" for the element at the upper-left corner. Meanwhile, the element at the lower-left corner of the grid 71 of FIG. 13A is in an even row, and therefore its brightness is increased. According to the correspondence table of FIG. 13B, "30" is added to "120" to obtain "150" for the element at the lower-left corner. Thus, it is possible to generate a two-dimensional code by embedding low-frequency parts and/or high-frequency parts in an invisible area as illustrated in FIGS. 12, 13A, and 13B.

Figure 14:
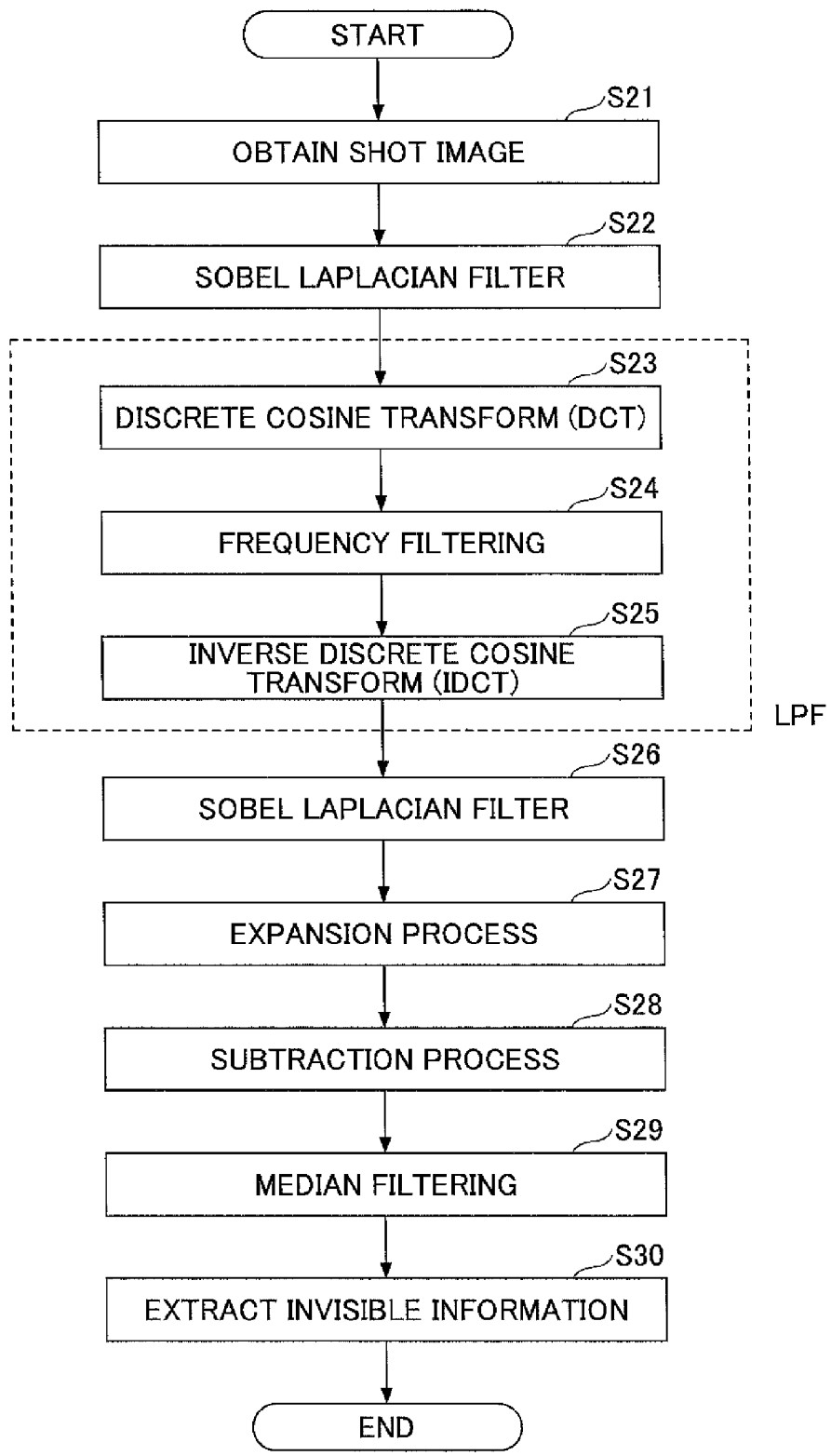
FIG. 14 is a flowchart illustrating an exemplary process of extracting invisible information.

An exemplary process, performed by the invisible information extracting unit 35, to extract invisible information is described below. FIG. 14 is a flowchart illustrating an exemplary process of extracting invisible information. In the descriptions below, it is assumed that invisible information generated using only high-frequency parts is extracted from a shot image. However, the present invention is not limited to this exemplary process.

In the exemplary process of FIG. 14, a shot image of an image or a video picture including invisible information is obtained (S21). Next, a Sobel Laplacian filter is applied to the obtained image to extract edges (where the brightness changes drastically) from the image, and the edges are converted into white color and other parts are converted into block color (S22). In other words, the Sobel Laplacian filter is applied to the shot image to extract both a code part (a collection of edges in the case of a high-frequency image) and edges of the background (image edges).

In "a collection of edges in the case of a high-frequency image", an edge indicates a part where the brightness changes drastically. Here, in a high-frequency image, light and dark elements are arranged alternately in the horizontal or vertical direction. Therefore, in the case of a high-frequency image, all boundaries between elements are edges.

Also, discrete cosine transform (DCT) is performed on the shot image obtained in step S21 to transform the shot image from the spatial domain to the frequency domain (S23). Next, frequency filtering is performed on the frequency image obtained in step S23 to convert values in the high-frequency region to "0" and to thereby remove high-frequency components from the image (S24).

Then, inverse discrete cosine transform (IDCT) is performed to transform the image filtered in step S24 back into the spatial domain (S25). Steps S23 through S25 are equivalent to a low-pass filter process.

The Sobel Laplacian filter is applied to the image obtained in step S25 to extract edges (where the brightness changes drastically) from the image, and the edges are converted into white color and other parts are converted into block color (S26).

Next, an expansion process is performed to increase the thickness of the edges obtained by the Sobel Laplacian filter (S27). For example, the obtained edges are expanded upward, downward, leftward, and rightward, respectively, by three pixels.

Then, a subtraction process is performed to subtract the background image (edges of the background image) obtained in step S27 from the image (edges+code image) obtained in step S22 (S28). As a result, only an image representing invisible information is extracted.

Next, median filtering (S29) is performed to remove noise components from the image obtained in step S28 (S29). For example, the value of a target pixel is replaced with a median of the values of 3×3=9 pixels around the target pixel.

Then, after the media filtering of step S29, invisible information is extracted from the image (S30). More specifically, invisible information is extracted from the image that includes only the invisible information as a result of the median filtering in step S29, and (1) shape (quadrangle) extraction, (2) projective transformation, (3) and "1 or 0" determination are performed on the extracted invisible information.

In (1) shape extraction, the coordinates of, for example, four corners of a quadrangle (code) in the image are calculated. The shape to be extracted is not limited to a quadrangle, and any predetermined shape may be extracted in this step. For example, when the shape is a triangle or a star shape, the coordinates of vertexes of the shape may be calculated.

In (2) projective transformation, a distorted code is restored to a square based on the obtained coordinates of the four corners. In (3) "1 or 0" determination, whether each data bit in the code is 1 or 0 is determined. For example, when the number of black pixels in a block representing one bit is greater than the number of white pixels, it is determined that the block represents "0". Meanwhile, when the number of white pixels is greater than the number of black pixels, it is determined that the block represents "1". The above described process makes it possible to accurately obtain one or more sets of invisible information from a shot image.

Figure 15:
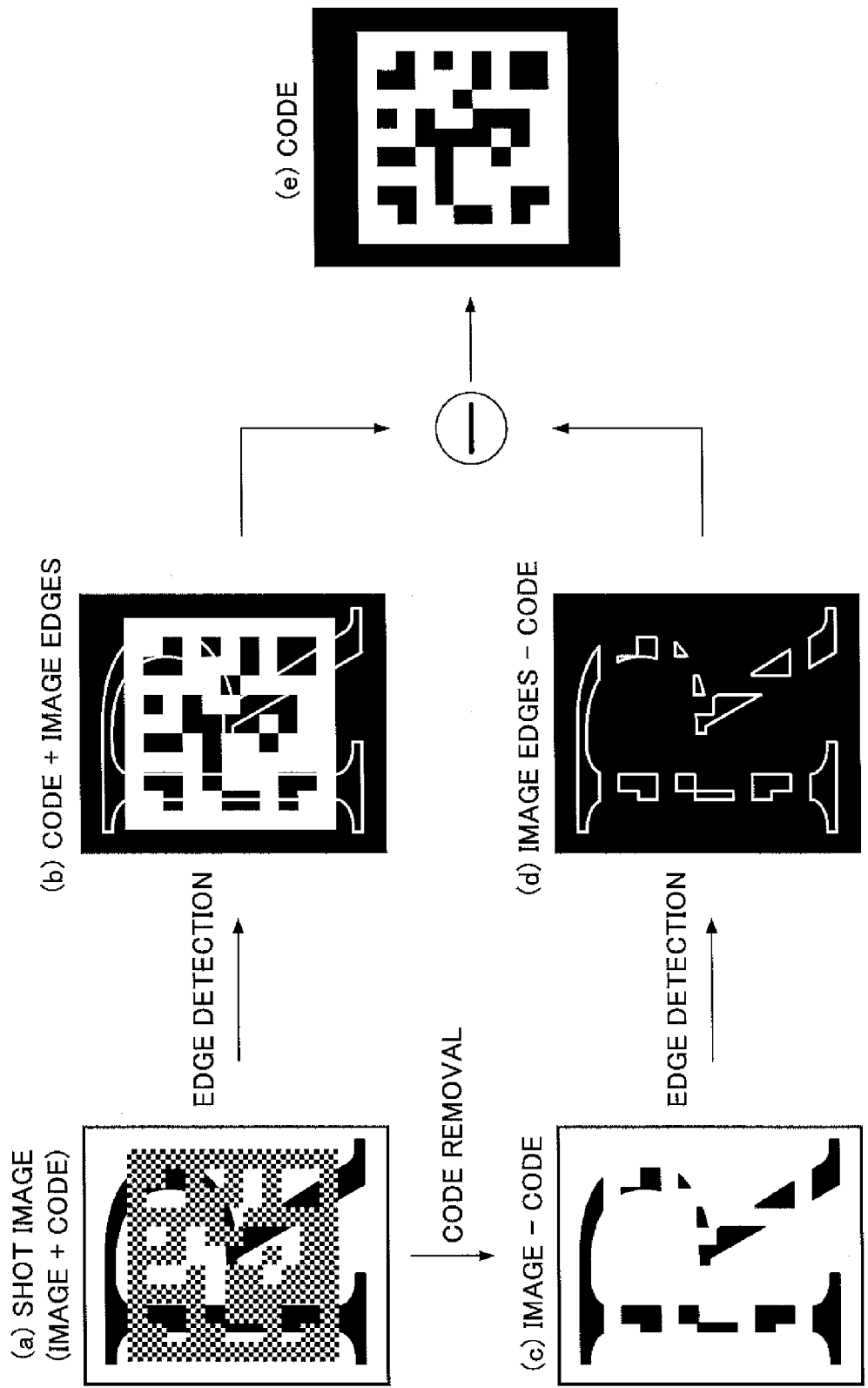
FIG. 15 is a drawing used to describe an exemplary method of extracting invisible information.

FIG. 15 is a drawing used to describe an exemplary method of extracting invisible information. In the example of FIG. 15, invisible information (Code) embedded in a character image (Image) representing "R" is extracted from a shot image.

Edge detection is performed on a shot image of FIG. 15 (a) to obtain an image (Code+Image edges) of FIG. 15 (b). Also, the code is removed from the shot image of FIG. 15 (a) to obtain an image (Image−Code) of FIG. 15 (c).

Next, edge detection is performed on the image (Image−Code) of FIG. 15 (c) to obtain an image (Image edges−code) of FIG. 15 (d) where the code is removed from the image edges.

The difference between the image of FIG. 15 (b) and the image of FIG. 15 (d) is obtained as the code as illustrated by FIG. 15 (e). Here, the result obtained by steps S23 through S25 of FIG. 14 corresponds to FIG. (c), the result obtained by step S27 corresponds to FIG. 15 (d), and the result obtained by step S29 corresponds to FIG. 15 (e).

The above described method makes it possible to accurately extract invisible information from a shot image. The invisible information extracting process described above may be performed on an entire shot image, or if the position of embedded invisible information in an image is known, the invisible information extracting process may be performed on a particular area of the image.

Figure 16:
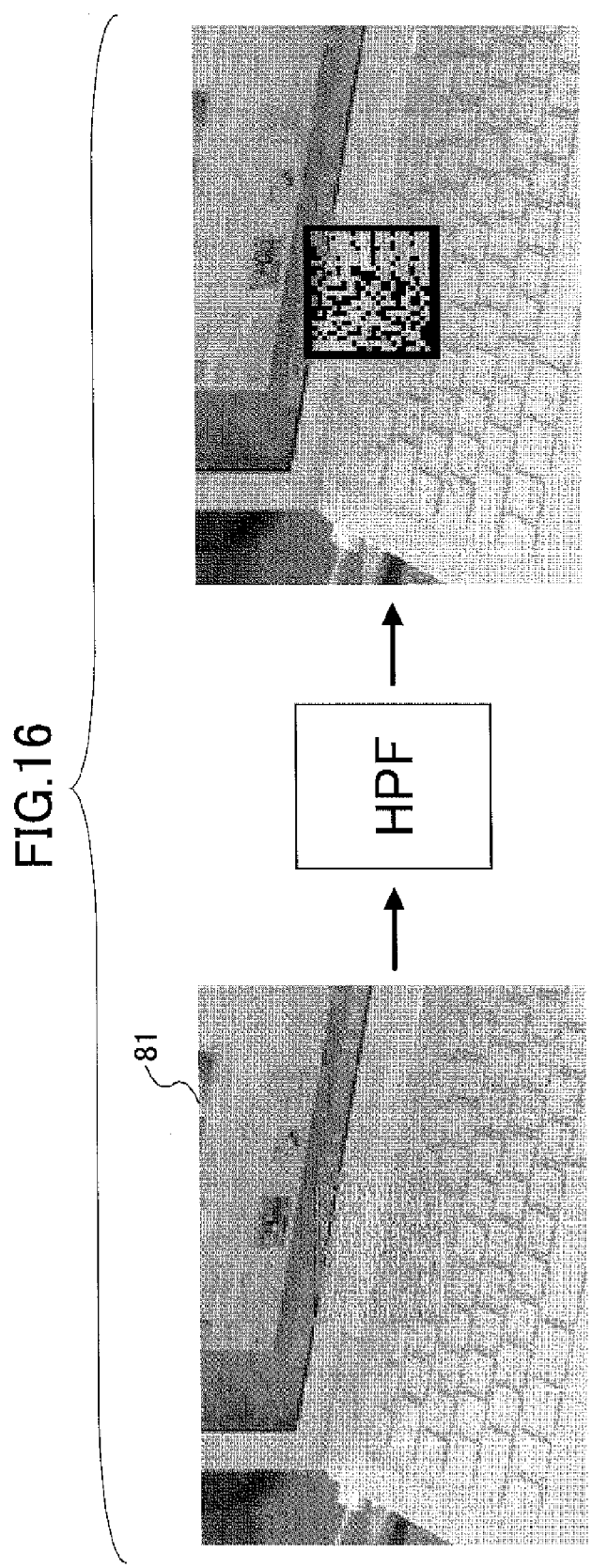
FIG. 16 is a drawing illustrating an exemplary result of detecting invisible information.

FIG. 16 is a drawing illustrating an exemplary result of detecting invisible information. According to the present embodiment, as illustrated in FIG. 16, high-pass filtering may be performed on a synthesized image 81 including invisible information to allow the display information generating unit 37 of the invisible information detecting apparatus 30 to display a two-dimensional code on the original image. In this case, the two-dimensional code may be scanned to display information represented by the two-dimensional code.

FIGS. 17A through 17H illustrate exemplary images to which invisible information is added. In each of FIGS. 17A through 17H, invisible information is embedded in an area 91. Thus, the present embodiment makes it possible to embed invisible information at an appropriate position in an image and thereby provide detailed and suitable information on an object displayed in a part of the image.

Figure 17A:
FIG. 17A is a drawing illustrating an exemplary image to which invisible information is added.
Figure 17B:
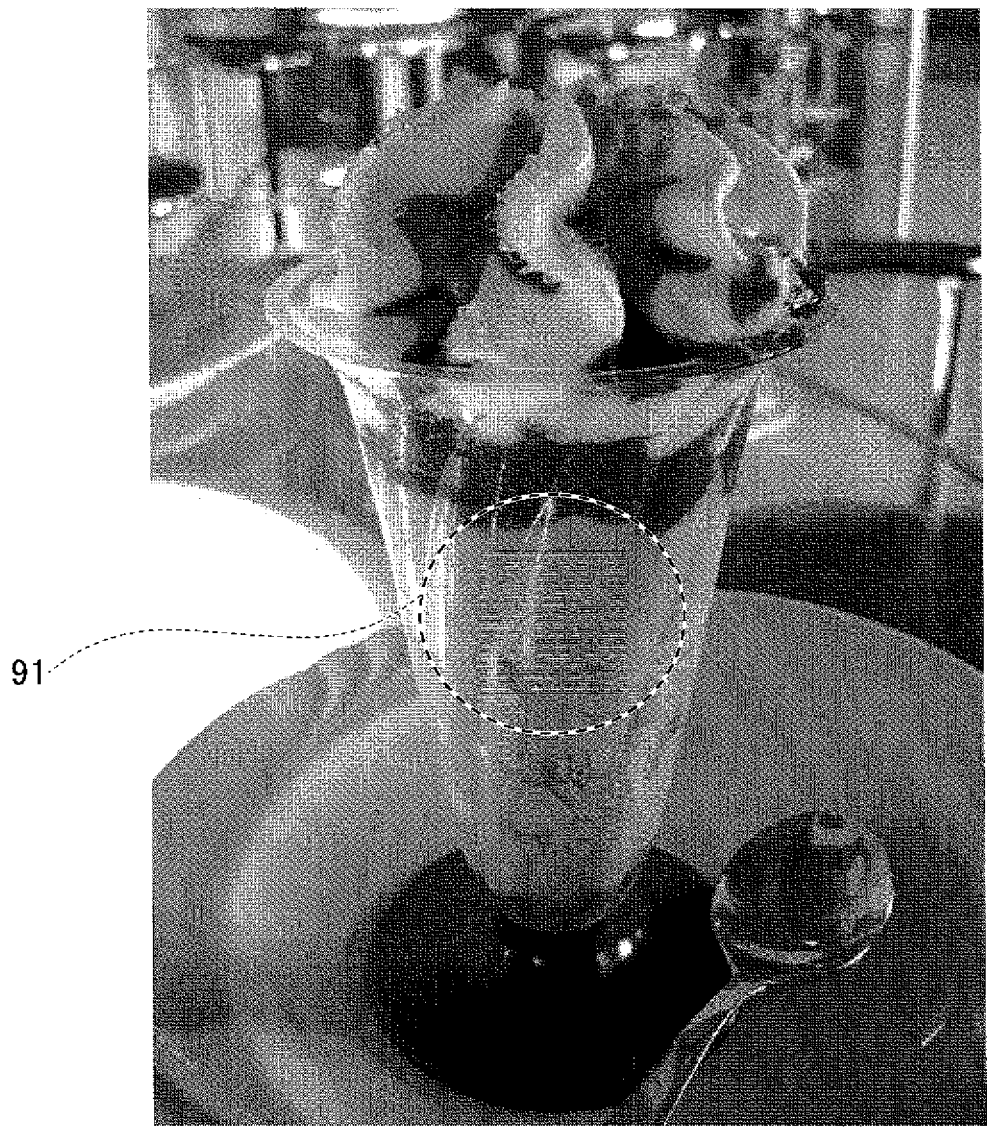
FIG. 17B is a drawing illustrating an exemplary image to which invisible information is added.
Figure 17C:
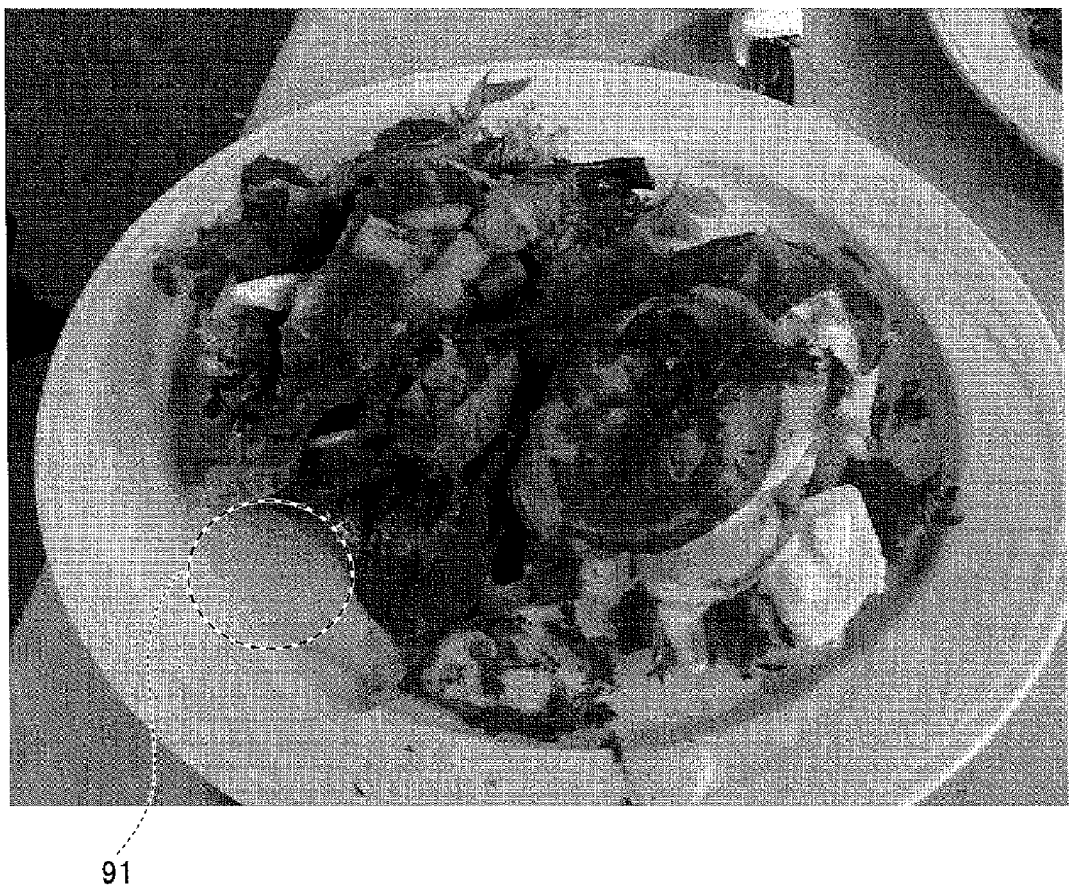
FIG. 17C is a drawing illustrating an exemplary image to which invisible information is added.
Figure 17D:
FIG. 17D is a drawing illustrating an exemplary image to which invisible information is added.
Figure 17E:
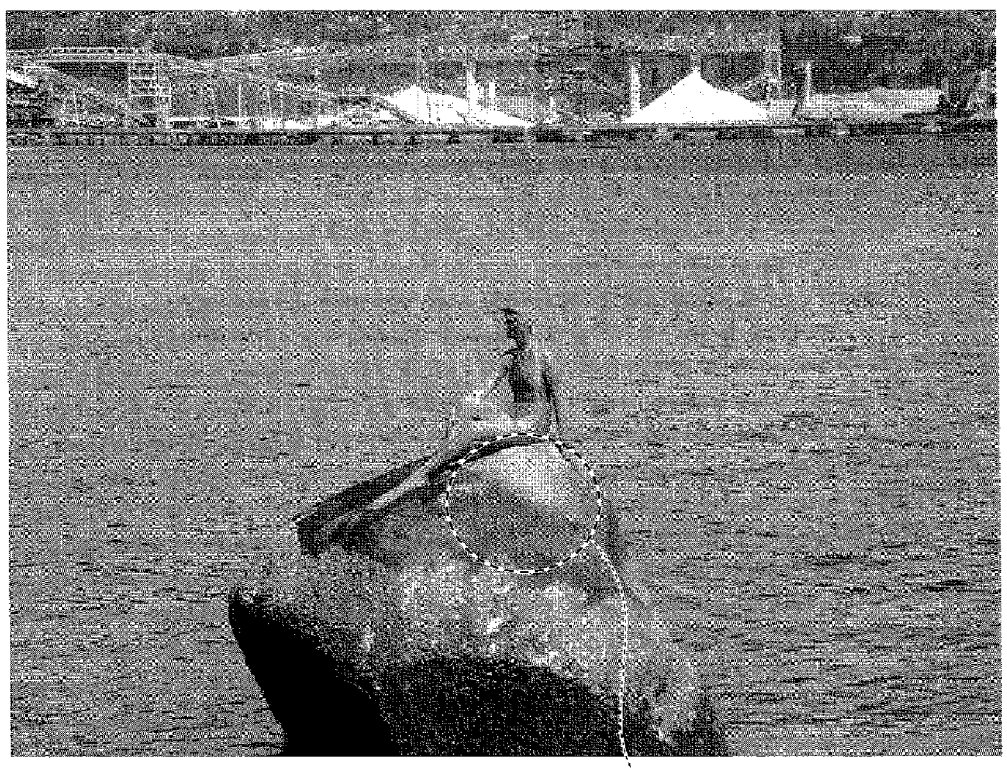
FIG. 17E is a drawing illustrating an exemplary image to which invisible information is added.
Figure 17F:
FIG. 17F is a drawing illustrating an exemplary image to which invisible information is added.

The code embedded as invisible information in the area 91 of the image in each of FIGS. 17A through 17C may include, for example, information related to the displayed product such as the product name, the material, taste evaluation results, the price, and shops selling the product, or an address (e.g., URL) of a server storing the aforementioned information. The code embedded as invisible information in the area 91 of the image of FIG. 17D may include, for example, information related to the displayed flower such as the name of the flower, the location where the image was shot, and the time when the flower blooms. The code embedded as invisible information in the area 91 of the image of FIG. 17E may include, for example, information related to the displayed sculpture such as the name of the sculpture, the location where the image was shot, and the reason why the sculpture was built. The code embedded as invisible information in the area 91 of the image of FIG. 17F may include information related to the displayed airplane such as the name of the airplane, the flight speed, and the location where the image was shot.

Figure 17G:
FIG. 17G is a drawing illustrating an exemplary image to which invisible information is added.
Figure 17H:
FIG. 17H is a drawing illustrating an exemplary image to which invisible information is added.

FIGS. 17G and 17H illustrate the same image, but the codes embedded as invisible information in the areas 91 of FIGS. 17G and 17H are generated in different manners. The code embedded as invisible information in the area 91 of FIG. 17G is generated using both high-frequency parts and low-frequency parts. Meanwhile, the code embedded as invisible information in the area 91 of FIG. 17H is generated using only high-frequency parts. As illustrated in FIG. 17G, when invisible information is generated using both high-frequency parts and low-frequency parts, depending on the original image, the low-frequency parts may blur. Meanwhile, as illustrated in FIG. 17G, invisible information generated using only high-frequency, parts is less noticeable when embedded in an image.

According to the present embodiment, multiple sets of invisible information can be embedded in different parts of one image. According to the present embodiment, invisible information can be embedded not only in an image displayed on a television screen or a PC screen, but also in a video displayed on a screen and an image printed on a print medium such as paper, a card, a postcard, or a poster.

The amount of data that can be embedded increases as the area of a code increases. The present embodiment makes it possible to adjust the size and the number of codes to be embedded in an original image according to the amount of data.

Figure 18:
FIG. 18 is a drawing illustrating invisible information according to another embodiment.

FIG. 18 is a drawing illustrating invisible information according to another embodiment. In the example of FIG. 18, either the high-frequency parts or the low-frequency parts are displayed in a predetermined color such as black. For example, when character information is embedded directly as invisible information, the embedded characters (in the example of FIG. 18, "RITS") can be directly output as display information. Also, the method of FIG. 18, for example, eliminates the need to search for supplemental information based on a code ID, and thereby makes it possible to quickly display supplemental information on a screen.

Next, the results of comparing a frequency method of the present embodiment and a related-art difference method are described. In the related-art difference method, information is obtained based on a difference between an original image and an image where the information is embedded. FIG. 19 is a table illustrating exemplary comparison results. In the frequency method used in the example of FIG. 19, invisible information representing a code is generated using low-frequency parts and high-frequency parts.

In FIG. 19, "read time" indicates time from when a code part is detected to when decoding is completed. Also in FIG. 19, values of "number of instructions executed" are calculated based on an assumption that the million instructions per second (MIPS) of "Intel core 2 duo" is 22,058 M.

As illustrated in FIG. 19, in all of the read time, the number of instructions executed, the CPU utilization, and the memory usage, the values of the frequency method of the present embodiment are better than those of the difference method.

Although not illustrated in FIG. 19, the read time of a code generated as invisible information using only high-frequency parts was 0.272 seconds (execution time). The execution environment used in this test includes MacOS X 10.6, 2 GHz Core 2 Duo CPU, and a memory of 2 G bytes. Thus, even when only high-frequency parts or low-frequency parts are used, it is possible to efficiently and properly read a code from a shot image.

Figure 20A:
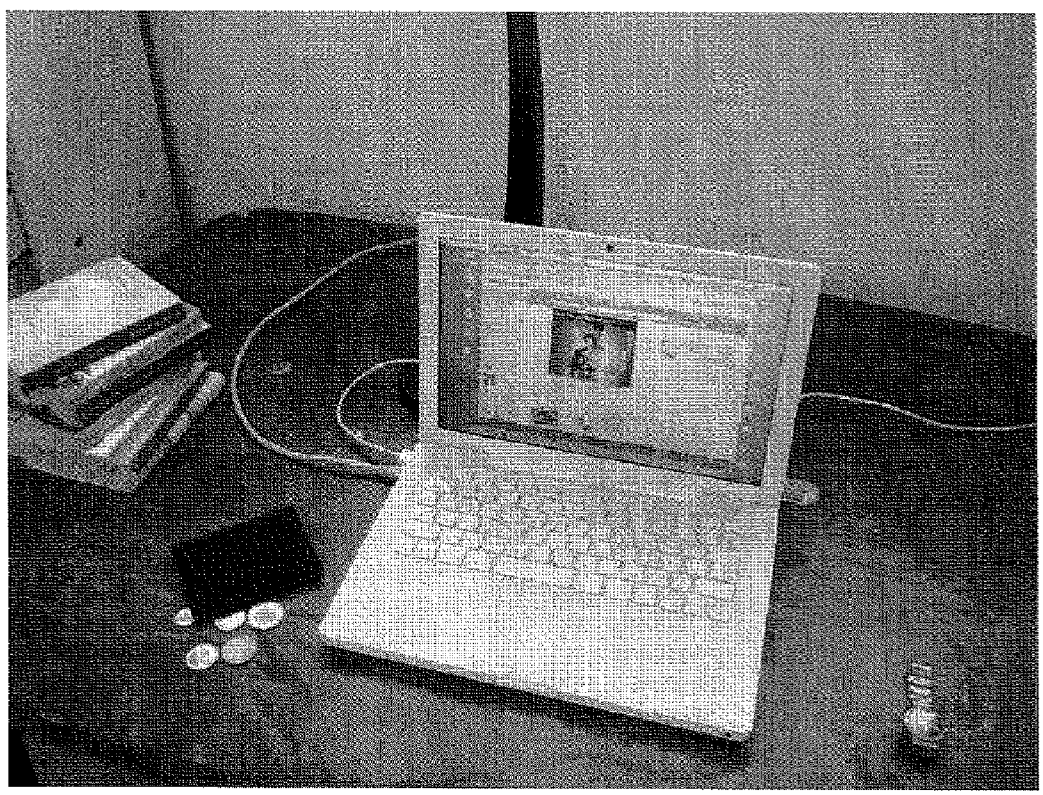
FIG. 20A is a drawing illustrating an exemplary image used for an invisibility confirmation test.
Figure 20B:
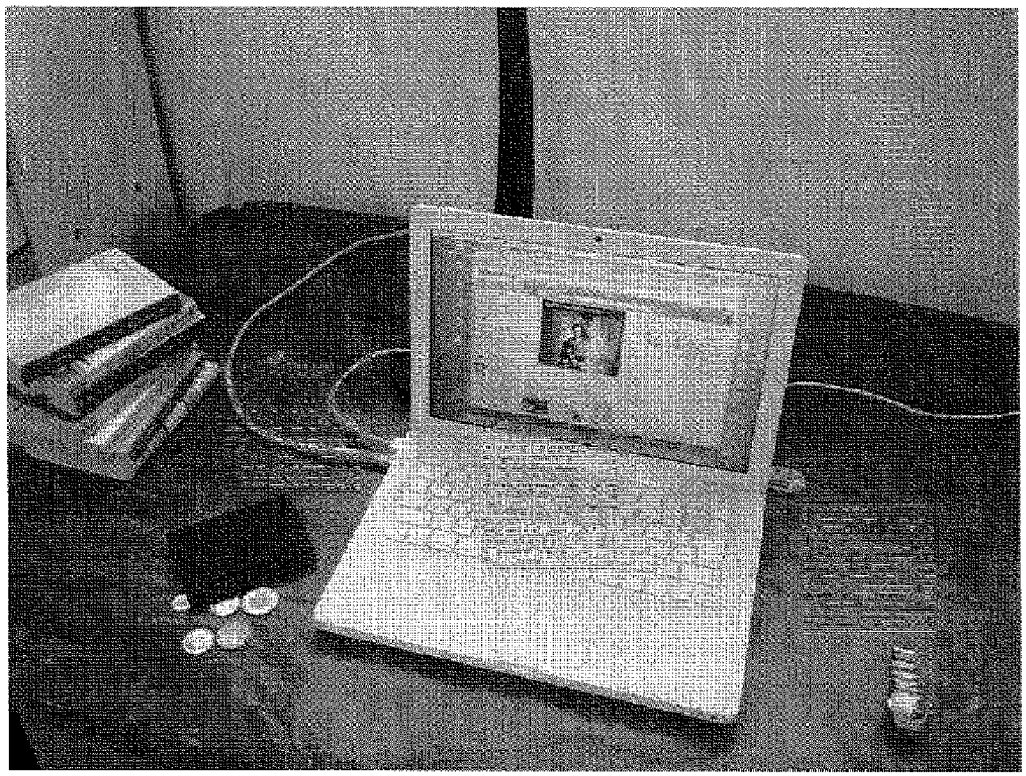
FIG. 20B is a drawing illustrating an exemplary image used for an invisibility confirmation test.

Next, results of an invisibility confirmation test performed on an image including invisible information generated according to the present embodiment are described. FIGS. 20A and 20B illustrate images used for the invisibility confirmation test. FIG. 20A illustrates an image where invisible information has not been embedded yet, and FIG. 20B illustrates an image where two-dimensional codes are embedded as invisible information according to the present embodiment. In FIG. 20B, the two-dimensional codes are embedded in the image at positions corresponding to the positions of the invisible information 56-1 through 56-3 in the image 50 of FIG. 6.

In the confirmation test, the image (FIG. 20A, 180 mm×135 mm) including no code and the image (FIG. 20B, 180 mm×135 mm) including the codes (25 mm×25 mm) were displayed side by side on a monitor, and nine testers were asked to view the two images for 15 seconds at a distance of 1 m and to report the difference between the two images.

As a result, one of the nine testers reported that "Horizontal lines are on the keyboard". The other eight testers reported that "No difference is detected". Also, the same images were processed using the invisible information detecting apparatus 30 of the present embodiment, and as a result, the invisible information (markers) was detected.

As described above, the present invention makes it possible to efficiently obtain information and provide a high-precision, high-value-added image.

Although the preferred embodiments are described above, the present invention is not limited to the specifically disclosed embodiments, and variations and modifications may be made without departing from the scope of the present invention.

The present international application claims priority from Japanese Patent Application No. 2009-278883 filed on Dec. 8, 2009 and Japanese Patent Application No. 2010-191267 filed on Aug. 27, 2010, the entire contents of which are hereby incorporated herein by reference.

The invention claimed is:

1. An invisible information embedding apparatus for embedding invisible information at a position in an obtained image, the invisible information embedding apparatus comprising:
    a storage unit that stores embedding determination information or supplemental information in association with object information; and
    a processor that implements
        an image analysis unit configured to obtain object information of an object by analyzing the object included in the image;
        an embedding target image determining unit configured to determine whether the image is an embedding target where the invisible information is to be embedded based on the embedding determination information stored in the storage unit in association with the obtained object information or based on whether the supplemental information associated with the obtained object information is stored in the storage unit;
        an image synthesizing unit configured to combine the image with the invisible information corresponding to the object information or the supplemental information based on the determination result of the embedding target image determining unit;
        an invisible information setting unit configured to set the invisible information to be combined by the image synthesizing unit; and
        an invisible information generating unit configured to generate an image to be combined based on the invisible information set by the invisible information setting unit, wherein
    the image analysis unit is further configured to obtain positional information of the object in the image;
    the image synthesizing unit is configured to combine the image with the invisible information for the object based on the positional information of the object obtained by the image analysis unit; and
    the invisible information setting unit is configured to set a two-dimensional code as the invisible information and to form a code part of the two-dimensional code using at least one of low-frequency parts and high-frequency parts having lower and higher brightness with respect to brightness of the original image.

2. An invisible information embedding method for embedding invisible information at a position in an obtained image, the invisible information embedding method comprising:
    storing embedding determination information or supplemental information in a storage unit in association with object information;
    obtaining object information of an object by analyzing the object included in the image;
    determining whether the image is an embedding target where the invisible information is to be embedded based on the embedding determination information stored in the storage unit in association with the obtained object information or based on whether the supplemental information associated with the obtained object information is stored in the storage unit;

combining the image with the invisible information corresponding to the object information or the supplemental information based on a result of the determining;
setting the invisible information to be combined in the combining; and
generating an image to be combined based on the set invisible information, wherein
in the obtaining, positional information of the object in the image is also obtained;
in the combining, the image is combined with the invisible information for the object based on the obtained positional information of the object; and
in the setting, a two-dimensional code is set as the invisible information and a code part of the two-dimensional code is formed using at least one of low-frequency parts and high-frequency parts having lower and higher brightness with respect to brightness of the original image.

3. A non-transitory computer-readable storage medium storing program code for causing a computer to perform the invisible information embedding method of claim 2.

\* \* \* \* \*